United States Patent
Choi et al.

(10) Patent No.: US 12,127,110 B2
(45) Date of Patent: *Oct. 22, 2024

(54) METHOD, UE, APPARATUS, AND STORAGE MEDIUM FOR MONITORING CONTROL CHANNEL IN WIRELESS COMMUNICATION SYSTEM, AND METHOD AND BS FOR TRANSMITTING CONTROL CHANNEL

(71) Applicant: LG ELECTRONICS INC., Seoul (KR)

(72) Inventors: Seunghwan Choi, Seoul (KR); Suckchel Yang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/239,564

(22) Filed: Aug. 29, 2023

(65) Prior Publication Data

US 2023/0413167 A1    Dec. 21, 2023

Related U.S. Application Data

(63) Continuation of application No. 18/111,190, filed on Feb. 17, 2023, now Pat. No. 11,785,539, which is a continuation of application No. PCT/KR2023/000367, filed on Jan. 9, 2023.

(30) Foreign Application Priority Data

Jan. 7, 2022 (KR) .................. 10-2022-0002966
Aug. 11, 2022 (KR) .................. 10-2022-0100803

(51) Int. Cl.
*H04W 48/18* (2009.01)
*H04W 24/02* (2009.01)
*H04W 72/232* (2023.01)

(52) U.S. Cl.
CPC ........... *H04W 48/18* (2013.01); *H04W 24/02* (2013.01); *H04W 72/232* (2023.01)

(58) Field of Classification Search
CPC ... H04W 48/18; H04W 24/02; H04W 72/232; H04W 48/12; H04W 24/08; H04W 72/0446; H04L 5/0094; H04L 5/001; H04L 5/0053; H04L 27/26025; Y02D 30/70

See application file for complete search history.

(56) References Cited

U.S. PATENT DOCUMENTS

2022/0150946 A1* 5/2022 Tsai .................. H04W 76/28
2022/0295401 A1* 9/2022 Lin .................. H04W 72/1263
2022/0303960 A1* 9/2022 Zhou .................. H04L 5/0053
2022/0330215 A1* 10/2022 Lai .................. H04W 74/0833
2022/0394734 A1* 12/2022 MolavianJazi ....... H04W 72/23

(Continued)

*Primary Examiner* — Julio R Perez
(74) *Attorney, Agent, or Firm* — LEE, HONG, DEGERMAN, KANG & WAIMEY

(57) ABSTRACT

A UE performs PDCCH monitoring for at least one serving cell by switching a search space set of a first SSSG to a search space of a second SSSG at a search space set group (SSSG) switching time. When PDCCH monitoring is performed in a unit of a slot-group for the at least one serving cell, the UE determines the SSSG switching time based on a largest Xs value among Xs values for the at least one serving cell.

17 Claims, 9 Drawing Sheets

(56) References Cited

U.S. PATENT DOCUMENTS

| | | | |
|---|---|---|---|
| 2023/0101780 A1* | 3/2023 | Ji | H04W 72/1263 370/329 |
| 2023/0142744 A1* | 5/2023 | Nam | H04L 5/0098 370/329 |
| 2023/0413167 A1* | 12/2023 | Choi | H04W 48/18 |

* cited by examiner

METHOD, UE, APPARATUS, AND STORAGE MEDIUM FOR MONITORING CONTROL CHANNEL IN WIRELESS COMMUNICATION SYSTEM, AND METHOD AND BS FOR TRANSMITTING CONTROL CHANNEL

CROSS-REFERENCE TO RELATED APPLICATION(S)

This application is a continuation of U.S. patent application Ser. No. 18/111,190, filed on Feb. 17, 2023, which is a continuation of International Application No. PCT/KR2023/000367 filed on Jan. 9, 2023, which claims the benefit of earlier filing date and right of priority to Korean Patent Application Nos. 10-2022-0002966, filed on Jan. 7, 2022, and 10-2022-0100803, filed on Aug. 11, 2022, the contents of which are hereby incorporated by reference herein in their entireties.

TECHNICAL FIELD

The present disclosure relates to a method and apparatus for use in a wireless communication system.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of code division multiple access (CDMA) system, frequency division multiple access (FDMA) system, time division multiple access (TDMA) system, orthogonal frequency division multiple access (OFDMA) system, single carrier frequency division multiple access (SC-FDMA) system, and the like.

SUMMARY

A technical object of the present disclosure is to provide a control channel monitoring method for effectively performing monitoring of a control channel in a wireless communication system, an apparatus therefor, a method of transmitting a control channel, and an apparatus therefor.

The technical problem of the present disclosure is not limited to the above-described technical problem, and other technical problems may be derived from the embodiments of the present disclosure.

A method of monitoring a control channel by a UE in a wireless communication system is provided.

According to another aspect of the present disclosure, a UE for monitoring a control channel in a wireless communication system is provided. The UE includes at least one transceiver, at least one processor, and at least one computer memory operatively connected to the at least one processor and configured to store instructions that when executed causes the at least one processor to perform operations.

According to another aspect of the present disclosure, an apparatus for the UE is provided. The apparatus includes at least one processor, and at least one computer memory operatively connected to the at least one processor and configured to store instructions that when executed causes the at least one processor to perform operations.

According to another aspect of the present disclosure, a computer-readable non-transitory storage medium containing at least one computer program for causing at least one processor to perform operations is provided.

According to another aspect of the present disclosure, a method of transmitting a control channel by a BS in a wireless communication system is provided.

According to another aspect of the present disclosure, a BS for transmitting a control channel in a wireless communication system is provided.

A method by the UE, or operations performed by executing instruction(s) that is(are) stored in the UE or at least one memory or a storage medium of the apparatus of the UE, includes: receiving search space configurations for at least one serving cell (e.g., a serving cell or a serving cell set), the search space configurations including at least a configuration regarding at least one search space set belonging to the first search space set group (SSSG) with a first group index and a configuration regarding at least one search space set belonging to a second SSSG with a second group index; performing physical downlink control channel (PDCCH) monitoring according to the search space set of the first SSSG for the serving cell set based on the search space configurations; and performing SSSG switching based on detection of a downlink control information (DCI) format for notifying the SSSG switching for the serving cell set or based on expiry of a SSSG switching related timer. Based on the serving cell set including a serving cell having a subcarrier spacing of 960 kHz, the SSSG switching includes: at a beginning of a first slot among slot-groups of Xs slots that is at least predetermined number $P_{switch}$ symbols after a last symbol of a PDCCH with the DCI format, i) stopping the PDCCH monitoring according to the search space set of the first SSSG and ii) starting the PDCCH monitoring according to the search space set of the second SSSG, where the slot-groups of Xs slots are consecutive. Based on the serving cell set including the serving cell having the subcarrier spacing of 960 kHz, the UE or the operations determines a slot and a symbol in the symbol to stop or start the PDCCH monitoring for the SSSG switching based on a largest Xs value among Xs values (e.g., Xs value(s) related/configured with the at least one serving cell) for the at least one serving cell set.

A method by the BS, or operations performed by executing instruction(s) that is(are) stored in at least one memory of the BS includes: transmitting search space configurations for at least one serving cell (e.g., a serving cell or a serving cell set), the search space configurations including at least a configuration regarding at least one search space set belonging to the first search space set group (SSSG) with a first group index and a configuration regarding at least one search space set belonging to a second SSSG with a second group index; transmitting at least one physical downlink control channel (PDCCH) according to the search space set of the first SSSG for the serving cell set based on the search space configurations; and performing SSSG switching based on transmission of a downlink control information (DCI) format for notifying the SSSG switching for the serving cell set or based on expiry of a SSSG switching related timer. Based on the serving cell set including a serving cell having a subcarrier spacing of 960 kHz, the SSSG switching includes: at a beginning of a first slot among slot-groups of Xs slots that is at least predetermined number $P_{switch}$ symbols after a last symbol of a PDCCH with the DCI format, i) stopping transmitting at least one PDCCH according to the search space set of the first SSSG and ii) starting transmitting at least one PDCCH according to the search space set of the second SSSG, where the slot-groups of Xs slots are consecutive, and based on the serving cell set including the serving cell having the subcarrier spacing of 960 kHz, the BS or the operations determines a slot and a symbol in the slot to performing the SSSG switching based on a largest Xs value among Xs values (e.g., Xs value(s) related/configured with the at least one serving cell) for the serving cell set.

In each aspect of the present disclosure, cell group configuration for switching may be provided to the UE by the BS. When the switching cell group configuration is provided, the at least one serving cell may be a serving cell set. Based on the cell group configuration for switching, the SSSG switching may be performed on all serving cells in the serving cell set.

In each aspect of the present disclosure, the cell group configuration for switching is a radio resource control (RRC) parameter cellGroupForSwitch.

In each aspect of the present disclosure, information regarding the predetermined number $P_{switch}$ may be provided to the UE by the BS.

In each aspect of the present disclosure, the predetermined number $P_{switch}$ is predefined for the subcarrier spacing of 960 kHz and processing capability of the UE.

In each aspect of the present disclosure, each search space set in the first SSSG and the second SSSG is configured based on one Xs value among Xs values for the serving cell set.

In each aspect of the present disclosure, each of the Xs values for the serving cell set is related to a search space set configured for the serving cell set.

In each aspect of the present disclosure, information regarding a location of a SSSG flag field in the DCI format for the at least one serving cell set is provided to the UE by the BS.

In each aspect of the present disclosure, the DCI format may be DCI format 2_0.

The aspects of the disclosure are only a part of the preferred embodiments of the disclosure, and various embodiments based on technical features of the disclosure may be devised and understood by the person with ordinary skill in the art based on the detailed description of the disclosure.

According to an embodiment of the disclosure, a UE may perform control signal monitoring more efficiently.

The technical effects of the present disclosure are not limited to the above-mentioned technical effects, and other technical effects may be derived from the embodiments of the present disclosure.

DETAILED DESCRIPTION

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

For clarity of description, the present disclosure will be described in the context of a 3GPP communication system (e.g., LTE and NR), which should not be construed as limiting the spirit of the present disclosure. LTE refers to a technology beyond 3GPP TS 36.xxx Release 8. Specifically, the LTE technology beyond 3GPP TS 36.xxx Release 10 is called LTE-A, and the LTE technology beyond 3GPP TS 36.xxx Release 13 is called LTE-A pro. 3GPP NR is the technology beyond 3GPP TS 38.xxx Release 15. LTE/NR may be referred to as a 3GPP system. "xxx" specifies a technical specification number. LTE/NR may be generically referred to as a 3GPP system. For the background technology, terminologies, abbreviations, and so on as used herein, refer to technical specifications published before the present disclosure. For example, the following documents may be referred to.

Figure 1:
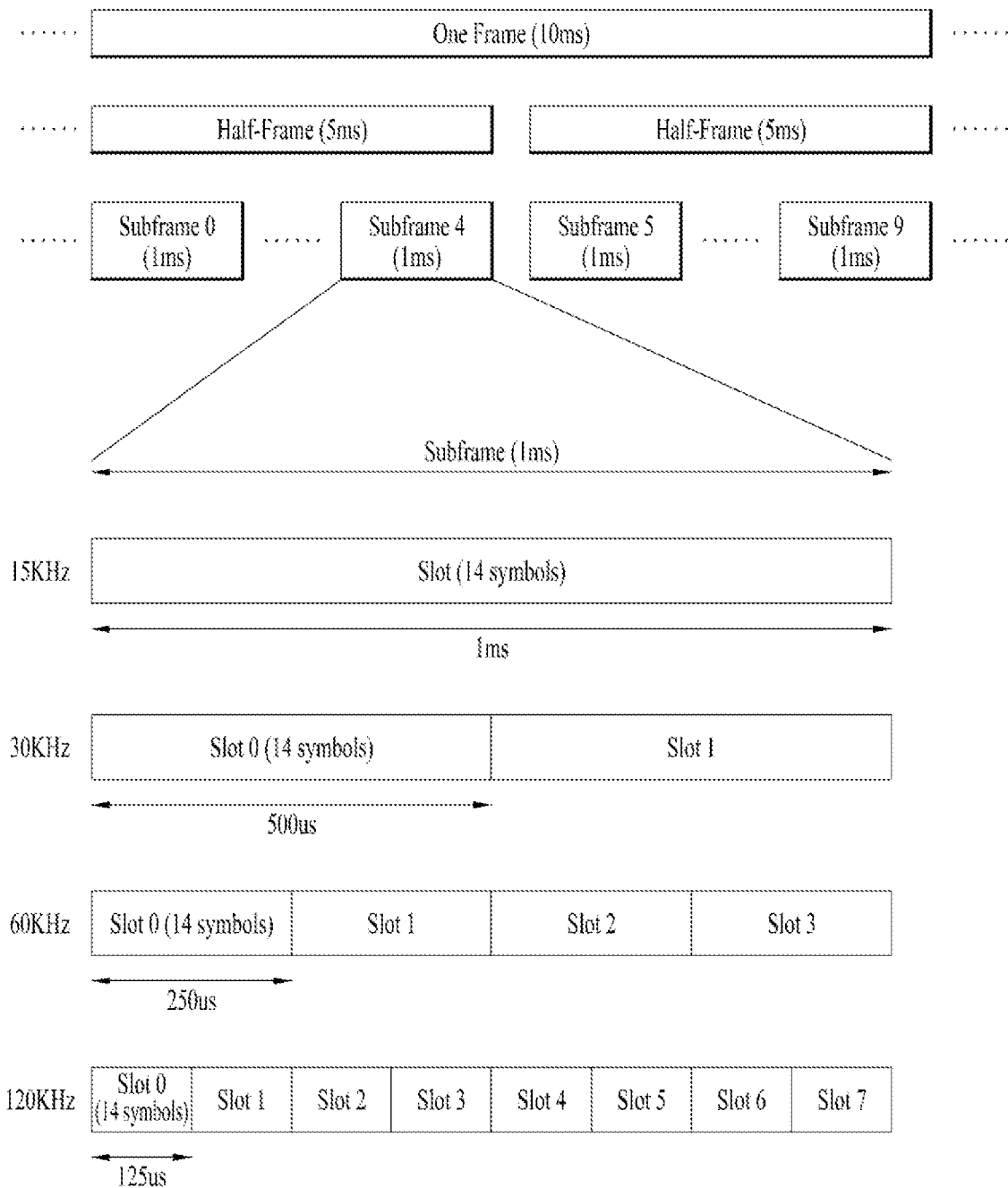
FIG. 1 illustrates a radio frame structure.

3GPP NR
38.211: Physical channels and modulation
38.212: Multiplexing and channel coding
38.213: Physical layer procedures for control
38.214: Physical layer procedures for data
38.300: NR and NG-RAN Overall Description
38.331: Radio Resource Control (RRC) protocol specification FIG. 1 illustrates a radio frame structure used for NR.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15 * 2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: number of symbols in a slot
* $N^{frame,u}_{slot}$: number of slots in a frame
* $N^{subframe,u}_{slot}$: number of slots in a subframe Table 2 illustrates that the number of symbols per slot, the number of slots per frame, and the number of slots per subframe vary according to SCSs in an extended CP ca.

TABLE 2

| SCS (15 * 2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

NR may support various numerologies (or subcarrier spacings (SCSs)) to provide various 5G services. For example, NR may support a wide area in conventional cellular bands for an SCS of 15 kHz and support a dense urban area and a wide carrier bandwidth with lower latency for an SCS of 30 or 60 kHz. For an SCS of 60 kHz or above, NR may support a bandwidth higher than 24.25 GHz to overcome phase noise.

NR frequency bands may be divided into two frequency ranges: frequency range 1 (FR1) and frequency range 2 (FR2). FR1 and FR2 may be configured as shown in Table A6 below. FR 2 may mean a millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

Figure 2:
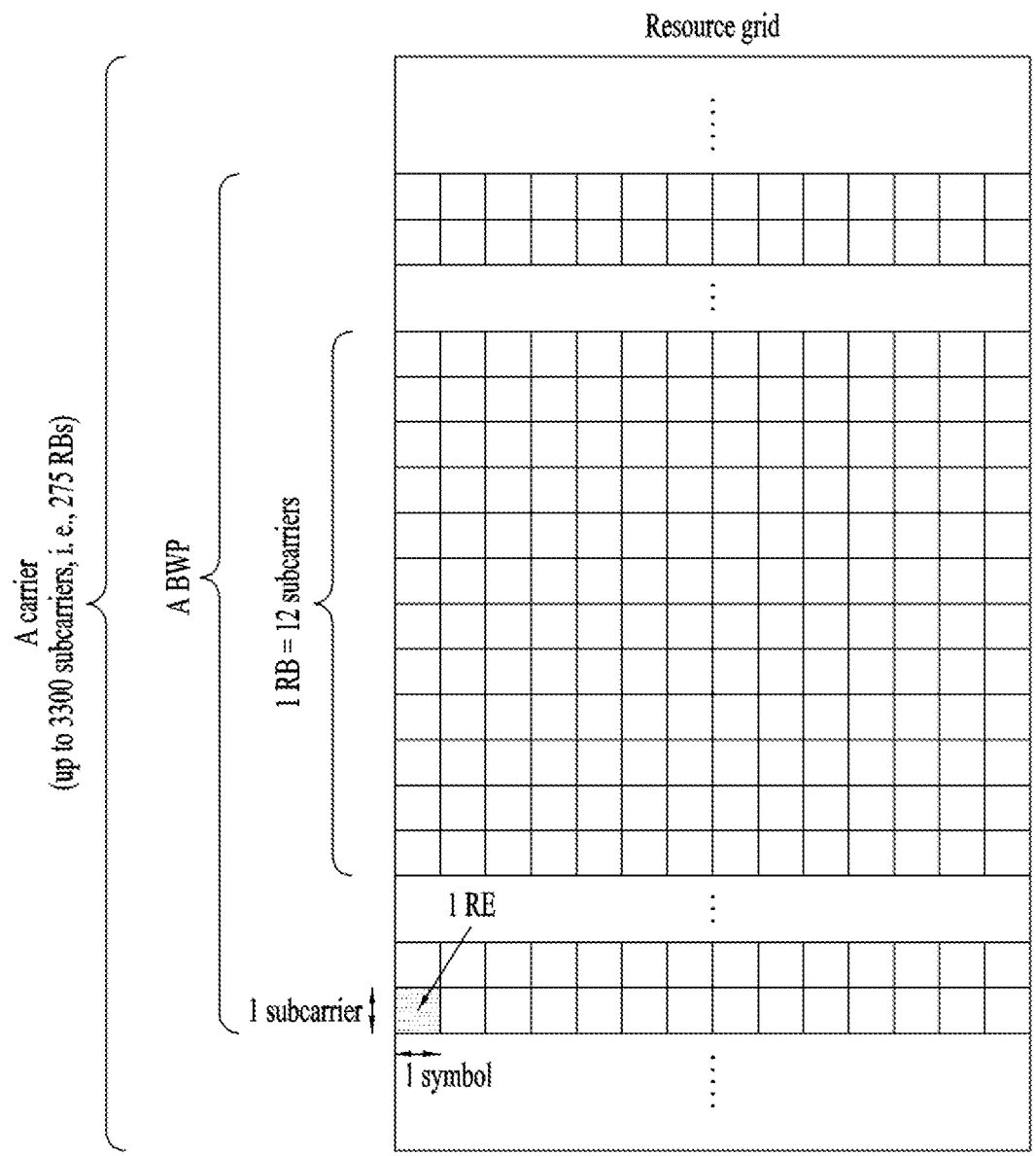
FIG. 2 illustrates a resource grid during the duration of a slot.

FIG. 2 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

In a wireless communication system, a UE receives information from a BS in downlink (DL), and the UE transmits information to the BS in uplink (UL). The information exchanged between the BS and UE includes data and various control information, and various physical channels/signals are present depending on the type/usage of the information exchanged therebetween. A physical channel corresponds to a set of resource elements (REs) carrying information originating from higher layers. A physical signal corresponds to a set of REs used by physical layers but does not carry information originating from the higher layers. The higher layers include a medium access control (MAC) layer, a radio link control (RLC) layer, a packet data convergence protocol (PDCP) layer, a radio resource control (RRC) layer, and so on.

DL physical channels include a physical broadcast channel (PBCH), a physical downlink shared channel (PDSCH), and a physical downlink control channel (PDCCH). DL physical signals include a DL reference signal (RS), a primary synchronization signal (PSS), and a secondary synchronization signal (SSS). The DL RS includes a demodulation reference signal (DM-RS), a phase tracking reference signal (PT-RS), and a channel state information reference signal (CSI-RS). UL physical channel include a physical random access channel (PRACH), a physical uplink shared channel (PUSCH), and a physical uplink control channel (PUCCH). UL physical signals include a UL RS. The UL RS includes a DM-RS, a PT-RS, and a sounding reference signal (SRS).

Figure 3:
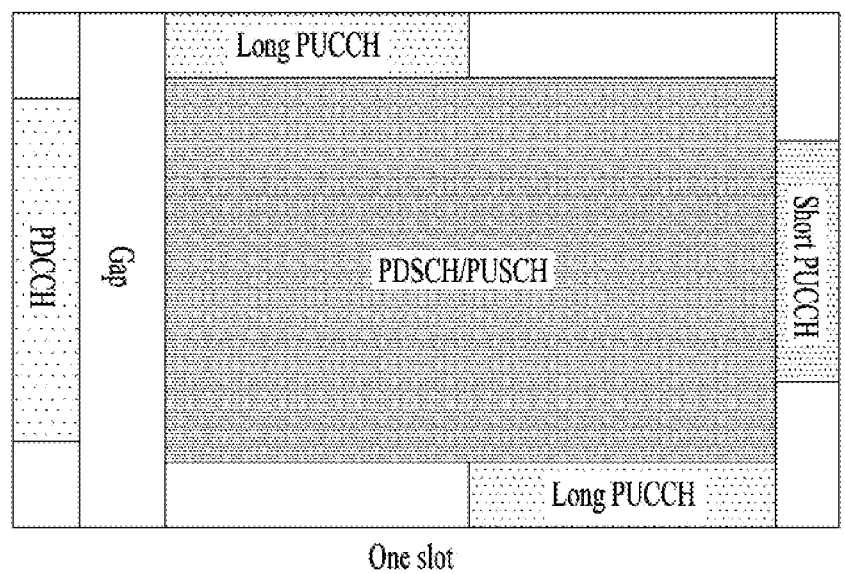
FIG. 3 shows an example in which a physical channel is mapped in a slot.

FIG. 3 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

In the present disclosure, a base station (BS) may be, for example, a gNode B (gNB).

DL Physical Channel/Signal (1) PDSCH

A PDSCH carries DL data (e.g., DL-shared channel transport block (DL-SCH TB)). The TB is coded into a codeword (CW) and then transmitted after scrambling and modulation processes. The CW includes one or more code blocks (CBs). One or more CBs may be grouped into one code block group (CBG). Depending on the configuration of a cell, the PDSCH may carry up to two CWs. Scrambling and modulation may be performed for each CW, and modulation symbols generated from each CW may be mapped to one or more layers. Each layer may be mapped to resources together with a DMRS after precoding and transmitted on a corresponding antenna port. The PDSCH may be dynamically scheduled by a PDCCH (dynamic scheduling). Alternatively, the PDSCH may be semi-statically scheduled based on higher layer (e.g., RRC) signaling (and/or Layer 1 (L1) signaling (e.g., PDCCH)) (configured scheduling (CS)). Therefore, in the dynamic scheduling, PDSCH transmission is accompanied by the PDCCH, whereas in the CS, PDSCH transmission may not be accompanied by the PDCCH. The CS may include semi-persistent scheduling (SPS).

(2) PDCCH

A PDCCH carries Downlink Control Information (DCI). For example, the PDCCH (i.e., DCI) may carry: transmission formats and resource allocation of a DL-SCH; frequency/time resource allocation information on an uplink shared channel (UL-SCH); paging information on a paging channel (PCH); system information on a DL-SCH; time/frequency resource allocation information on a higher layer control message such as a random access response (RAR) transmitted over a PDSCH; transmit power control commands; and information on activation/deactivation of SPS/CS. Various DCI formats may be provided depending on information in DCI.

Table 4 shows DCI formats transmitted over the PDCCH.

TABLE 4

| DCI format | Usage |
| --- | --- |
| 0_0 | Scheduling of PUSCH in one cell |
| 0_1 | Scheduling of one or multiple PUSCH in one cell, or indicating downlink feedback information for configured grant PUSCH (CG-DFI) |
| 1_0 | Scheduling of PDSCH in one cell |
| 1_1 | Scheduling of PDSCH in one cell, and/or triggering one shot HARQ-ACK codebook feedback |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |

TABLE 4-continued

| DCI format | Usage |
| --- | --- |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a CBG-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or UL scheduling information. DCI format 2_0 may be used to provide dynamic slot format information (e.g., dynamic SFI) to the UE, and DCI format 2_1 may be used to provide downlink pre-emption information to the UE. UEs defined as one group may be provided with DCI format 2_0 and/or DCI format 2_1 over a group common PDCCH, which is a PDCCH defined for a group of UEs.

The PDCCH/DCI may include a cyclic redundancy check (CRC), and the CRC may be masked/scrambled with various identifiers (e.g., radio network temporary identifier (RNTI)) according to the owner or purpose of the PDCCH. For example, if the PDCCH is for a specific UE, the CRC may be masked with a cell-RNTI (C-RNTI). If the PDCCH relates to paging, the CRC may be masked with a paging-RNTI (P-RNTI). If the PDCCH relates to system information (e.g., system information block (SIB)), the CRC may be masked with a system information RNTI (SI-RNTI). If the PDCCH relates to a random access response, the CRC may be masked with a random access-RNTI (RA-RNTI).

Table 5 shows the usage of the PDCCH and transport channels according to the type of RNTI. Here, the transport channel means a transport channel related to data carried by a PDSCH/PUSCH scheduled by the PDCCH.

TABLE 5

| RNTI | Usage | Transport Channel |
| --- | --- | --- |
| P-RNTI | Paging and System Information change notification | PCH(Paging Channel) |
| SI-RNTI | Broadcast of System Information | DL-SCH |
| RA-RNTI | Random Access Response | DL-SCH |
| Temporary C-RNTI | Contention Resolution (when no valid C-RNTI is available) | DL-SCH |
| Temporary C-RNTI | Msg3 transmission | UL-SCH |
| C-RNTI, MCS(Modulation and Coding Scheme)-C-RNTI | Dynamically scheduled unicast transmission | UL-SCH |
| C-RNTI | Dynamically scheduled unicast transmission | DL-SCH |
| MCS-C-RNTI | Dynamically scheduled unicast transmission | DL-SCH |
| C-RNTI | Triggering of PDCCH ordered random access | N/A |
| CS(Configured Scheduling)-RNTI | Configured scheduled unicast transmission (activation, reactivation and retransmission) | DL-SCH, UL-SCH |
| CS-RNTI | Configured scheduled unicast transmission (deactivation) | N/A |
| TPC(Transmit Power Control)-PUCCH-RNTI | PUCCH power control | N/A |
| TPC-PUSCH-RNTI | PUSCH power control | N/A |
| TPC-SRS-RNTI | SRS trigger and power control | N/A |
| INT(Interruption)-RNTI | Indication pre-emption in DL | N/A |
| SFI(Slot Format Indication)-RNTI | Slot Format Indication on the given cell | N/A |
| SP(Semi-persistent)-CSI(Channel State Information-RNTI | Activation of Semi-persistent CSI reporting on PUSCH | N/A |

For the PDCCH, a fixed modulation scheme may be used (e.g., quadrature phase shift keying (QPSK)). One PDCCH may include 1, 2, 4, 8, or 16 control channel elements (CCEs) depending on the aggregation level (AL). One CCE may include 6 resource element groups (REGs), and one REG may be defined by one OFDMA symbol and one (P)RB.

The PDCCH may be transmitted in a control resource set (CORESET). The CORESET corresponds to a set of physical resources/parameters used to carry the PDCCH/DCI within a BWP. For example, the CORESET may include a set of REGs with a given numerology (e.g., SCS, CP length, etc.). The CORESET may be configured by system information (e.g., MIB) or UE-specific higher layer (e.g., RRC) signaling. For example, the following parameters/information may be used to configure the CORESET. One UE may be configured with one or more CORESETs, and a plurality of CORESETs may overlap in the time/frequency domain.

- controlResourceSetId: this parameter/information indicates the identifier (ID) of the CORESET.
- frequencyDomainResources: this parameter/information indicates frequency-domain resources of the CORESET. The frequency-domain resources may be indicated by a bitmap, and each bit corresponds to an RB group (=6 consecutive RBs). For example, the most significant bit (MSB) of the bitmap corresponds to the first RB group in the BWP. An RB group corresponding to a bit with a value of 1 may be allocated as a frequency-domain resource of the CORESET.
- duration: this parameter/information indicates time-domain resources of the CORESET. The parameter/information duration may indicate the number of consecutive OFDMA symbols included in the CORESET. For example, duration has a value of 1-3.
- cce-REG-MappingType: this parameter/information indicates a CCE-to-REG mapping type. An interleaved type and a non-interleaved type may be supported.
- precoderGranularity: this parameter/information indicates a precoder granularity in the frequency domain.
- tci-StatesPDCCH: this parameter/information indicates information (e.g., TCI-StateID) on a transmission configuration indication (TCI) state for the PDCCH. The TCI state may be used to provide a quasi-co-location (QCL) relationship between DL RS(s) in an RS set (TCI-state) and a PDCCH DMRS port.
- tci-PresentInDCI: this parameter/information indicates whether a TCI field is included in DCI.
- pdcch-DMRS-ScramblingID: this parameter/information indicates information used for initialization of a PDCCH DMRS scrambling sequence.

For PDCCH reception, the UE may monitor (e.g., blind decoding) a set of PDCCH candidates in the CORESET. The PDCCH candidate may mean CCE(s) monitored by the UE for PDCCH reception/detection. PDCCH monitoring may be performed in one or more CORESETs in an active DL BWP on each active cell in which the PDCCH monitoring is configured. The set of PDCCH candidates monitored by the UE may be defined as a PDCCH search space (SS) set. The SS set may be classified into a common search space (CSS) set or a UE-specific search space (USS) set.

Table 6 shows PDCCH search spaces.

TABLE 6

| Search Space | Type | RNTI | Use Case |
| --- | --- | --- | --- |
| Type0-PDCCH | Common | SI-RNTI on a primary cell | Broadcast of System Information |
| Type0A-PDCCH | Common | SI-RNTI on a primary cell | Broadcast of System Information |
| Type1-PDCCH | Common | RA-RNTI or TC-RNTI on a primary cell | Msg2, Msg4 in RACH |
| Type2-PDCCH | Common | P-RNTI on a primary cell | Paging System Information change notification |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI or CS-RNTI | Group signaling |
| UE Specific | UE Specific | C-RNTI, MCS-C-RNTI or CS-RNTI | UE signaling (e.g., PDSCH/PUSCH) |

The SS set may be configured by system information (e.g., MIB) or UE-specific higher layer (e.g., RRC) signaling. S (e.g., 10) SS sets or less may be configured in each DL BWP of a serving cell. For example, the following parameters/information may be provided for each SS set. Each SS set may be associated with one CORESET, and each CORESET configuration may be associated with one or more SS sets.

- searchSpaceId: this parameter/information indicates the ID of the SS set.
- controlResourceSetId: this parameter/information indicates the CORESET associated with the SS set.
- monitoringSlotPeriodicityAndOffset: this parameter/information indicates a PDCCH monitoring periodicity (in a unit of slot) and a PDCCH monitoring offset (in a unit of slot)
- monitoringSymbolsWithinSlot: this parameter/information indicates first OFDMA symbol(s) for PDCCH monitoring in a slot in which the PDCCH monitoring is configured. The first OFDMA symbol(s) are indicated by a bitmap, and each bit corresponds to each OFDMA symbol in the slot. The MSB of the bitmap corresponds to the first OFDM symbol in the slot. OFDMA symbol(s) corresponding to bit(s) with a value of 1 corresponds to the first symbol(s) in the CORESET in the slot.
- nrofCandidates: this parameter/information indicates the number of PDCCH candidates (e.g., one of 0, 1, 2, 3, 4, 5, 6, and 8) for each AL (where AL={1, 2, 4, 8, 16}).
- searchSpaceType: this parameter/information indicates whether the SS type is the CSS or USS.
- DCI format: this parameter/information indicates the DCI format of a PDCCH candidate.

The UE may monitor PDCCH candidates in one or more SS sets in a slot according to the configuration of the CORESET/SS set. An occasion (e.g., time/frequency resource) to monitor PDCCH candidates is defined as a PDCCH (monitoring) occasion. One or more PDCCH (monitoring) occasions may be configured within a slot.

In the present disclosure, a scheduling cell refers to a cell through which a PDCCH is transmitted or a cell in which a UE performs PDCCH monitoring, and a scheduled cell refers to a cell to which PUSCH/PDSCH resource(s) is allocated/to be allocated by DCI carried by a PDCCH. When cross-carrier scheduling is configured for a serving cell, which cell signals downlink assignments and uplink grants for the serving cell, that is, which cell is a scheduling cell for the serving cell may be configured to the UE. DCI including resource allocation information for the PUSCH/PDSCH may include information about which cell the resource allocation information is for, that is, which cell is a cell scheduled by the DCI. The serving cell through which the PDCCH is transmitted may be a cell on which it is scheduled.

1. Control Channel Monitoring in High Frequency Band

The above description may be applied in combination with the methods proposed in the present disclosure to be described later, or may be supplemented to clarify the technical characteristics of the methods proposed in the present disclosure.

In addition, the methods to be described later may be equally applied to the above-described NR system (licensed band) or shared spectrum, and may be modified or replaced to fit the terms, expressions, structures, and the like defined in each system to implement the technical idea proposed in the present disclosure in the corresponding system.

In a NR system, multiple numerologies (or subcarrier spacing (SCS)) are supported to support a variety of 5G services. For example, a wide area in typical cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more. An NR frequency band up to Release 16 may be defined as two types of frequency ranges (FR1 and FR2) and may be configured as shown in Table 3. In addition, discussions are going on to support future NR systems in a frequency band defined in FR1/FR2 or higher (e.g., 52.6 GHz to 71 GHz).

A higher frequency band than FR1 and FR2 bands (e.g., 52.6 GHz to 114.25 GHz band, particularly 52.6 GHz to 71 GHz) may be referred to as FR2-2. Waveforms, SCS, CP length, timing, etc. defined for FR1 and FR2 in the existing NR system may not be applied to FR2-2.

SCS of 120 kHz, 480 kHz, and 960 kHz may be used for an operation of the NR in an FR2-2 band. In the case of SCS of 480 kHz and 960 kHz, the length of an OFDM symbol may be shorter than that of 120 kHz. For example, an OFDM symbol of 480 kHz is ¼ the length of an OFDM symbol of 120 kHz, and an OFDM symbol of 960 kHz is ⅛ times of the length of an OFDM symbol of 120 kHz. For a short-length slot to which 480 kHz and 960 kHz are applied, when a PDCCH monitoring operation is performed in all slots, the UE may have a burden such as power consumption. Therefore, when SCS of 480 kHz and/or 960 kHz is configured, multi-slot PDCCH monitoring may be introduced.

Multi-slot PDCCH monitoring refers to an operation of performing PDCCH monitoring by determining blind decoding (BD)/control channel element (CCE) limits based on a plurality of consecutive slots and/or on a basis of a plurality of consecutive slots. In the conventional NR rel-15, BD/CCE limits may be determined in units of one slot, and in NR rel-16, BD/CCE limits may be determined in units of spans confined within one slot. The span may mean a PDCCH monitoring unit including consecutive symbols.

Hereinafter, PDCCH monitoring performed in units of slots may be expressed as per-slot monitoring, PDCCH monitoring performed in units of spans may be expressed as per-span monitoring, and PDCCH monitoring performed in units of slots-groups may be expressed as per-X monitoring. Hereinafter, the terms "slot-group size", "X" and "Xs" referred to in relation to multi-slot (PDCCH) monitoring (i.e., per-X monitoring) may be used to refer to a time unit of the per-X monitoring.

BD limits refer to "Maximum number of monitored PDCCH candidates for a DL BWP with SCS configuration for a single serving cell" on the 3GPP standard, and CCE limits refer to "Maximum number of non-overlapped CCEs for a DL BWP with SCS configuration for a single serving cell" on the 3GPP standard.

A plurality of consecutive slots, which are a reference of multi-slot PDCCH monitoring, is referred to as a slot-group. A slot-group may include X consecutive slots, and BD/CCE limits may be defined in units of slot-groups. For example, for SCS of 480 kHz, BD/CCE limit per slot-group including X=4 slots may be defined. In addition, Y consecutive slots may be defined in a slot-group. There may be types of search space (SS) sets that are limited in such a way that PDCCH monitoring is performed only in Y slots. In some implementations, for a per-X monitoring operation, some parameters (e.g., periodicity, offset, or duration) of the SS set configuration need to be configured (to a UE by a BS) in units of X. For example, the periodicity may be configured as a value in units of slots in per-slot monitoring, but may be configured in units of X slots in per-X monitoring. For example, if X=8 is configured in a cell in which SCS of 960 kHz is used, a period value for per-X monitoring may include only a multiple of 8.

In per-X monitoring operating based on different Xs (or when the UE is reported to support a plurality of Xs), the BS may explicitly indicate a corresponding cell and/or an X value for SCS to the UE via separate RRC signaling or the like. When there is no separate instruction or before RRC signaling, the UE may determine and/or derive X actually used for a SS set configuration among the Xs reported to the BS through a value of the SS set configuration and may perform the per-X monitoring operation.

A UE (e.g., UE) configured with a multi-cell operation (e.g., carrier aggregation (CA)) may perform PDCCH monitoring for a plurality of cells. In this case, different SCSs may also be configured for each cell. When per-X monitoring is configured, per-X monitoring may operate based on different X values for each cell (even in the same SCS). Therefore, the X value may need to be indicated to the UE for each cell. Alternatively, for all cells in which different X values are configured, a reference X for which per-X monitoring is capable of operating may be required.

Hereinafter, in a situation in which different X values are reported, a method of determining a reference X used for configuring an SS set is proposed. In addition, a configuration method for SS set group switching introduced in Rel-16 to operate (multi-cell situation) for a plurality of Xs as described above is proposed.

In the Rel-15/16 NR operation, the SS set configuration for per-slot monitoring and per-span monitoring may be achieved by signaling information on a periodicity of PDCCH monitoring, an offset expressed in units of slots from a frame boundary, and a duration (Number of consecutive slots that a SearchSpace lasts in every occasion, i.e., upon every period as given in the periodicityAndOffset) indicating the number of slots in which SS sets are present within the period, to the UE through a related RRC parameter. The UE may determine a PDCCH monitoring occasion from a monitoring pattern within the periodicity, the offset, the duration, and the slot.

Per-X monitoring may be performed by PDCCH monitoring in a slot-group unit including X slots. According to an SS set type, in some SS sets, PDCCH monitoring may be performed only in Y slots in a slot-group. In slots other than Y slots among the X slots, some SS sets may not be monitored according to an SS set type. Accordingly, a SS set configuration parameter such as a periodicity for determining a PDCCH monitoring occasion (MO) position needs to be configured in units of X slots. Supportable X for each UE may be different, and the UE may report one or more supportable X values to the BS. The BS may configure an SS set based on one of the reported X values, and may transmit the configuration information to the UE via related RRC signaling.

A method of configuring a SS set configuration parameter (e.g., periodicity, offset, and/or duration) in units of X may have various forms. For example, a new RRC parameter having a value of X units may be defined instead of a conventional RRC parameter having a value of one slot unit. In addition, even if the conventional RRC parameter value in units of one slot is transmitted by the BS, the UE may apply a value obtained by multiplying the received RRC parameter value by X for each SCS (and using X reported or determined by the UE). It may also be possible to configure only a value that is a multiple of X for each SCS (and reported or determined by the UE) among the conventional RRC parameter values in units of one slot. It may be understood that an X unit configuration of the SS set configuration expressed in the proposed methods to be described below includes such a configuration method.

An SS set configuration for the per-X monitoring operation needs to be performed in units of X slots. Depending on an SS set type, MOs of some SS sets (which will be referred to as Group 2 SS for convenience) may be located anywhere in any slot of a slot-group comprised of X slots (i.e., a slot-group with size X). MOs of some other SS sets (which will be referred to as Group 1 SSs for convenience) may be located only in a specific Y slot within a slot-group. For example, group 1 SS may include Type 1 CSS with dedicated RRC configuration and type 3 CSS, UE specific SS. Group 2 SS may refer to Type 1 CSS without dedicated RRC configuration and type 0, 0A, and 2 CSS.

Hereinafter, an SS set configuration method for per-X monitoring (operating in a multi-cell environment) will be described by dividing the method into group 1 SS and group 2 SS.

(Proposal 1) When the UE reports plural X values (that it is supported) for the per-X monitoring operation, the configuration (e.g., periodicity, offset, or duration) for the group 1 SS may be configured based on the minimum value among the reported Xs, and the UE may determine the PDCCH MO based on the minimum X value.

In order to make the MO of the group 1 SS exist only in the Y slot among the X slots, the SS set configuration (e.g., periodicity, offset, and/or duration) values for the corresponding SSs need to include only a multiple of X. When the UE reports many supportable Xs for per-X monitoring for specific SCS (or reports optional Xs in addition to the mandatorily supported Xs), the BS may determine X as a reference for SS set configuration in units of X, and the BS may also determine an MO based on the same X.

For example, for per-X monitoring operating at SCS of 960 kHz, if the UE reports that X=8 and X=4 are supportable, the MO configured based on X=4 may exist every 4 slots. (e.g., periodicity is a multiple of 4), and an MO configured based on X=8 may exist every 8 slots (e.g., periodicity is a multiple of 8). Therefore, the SS set configuration needs to be configured based on X=4, which is a common divisor of two X values, and the UE needs to determine the MO assuming the corresponding X=4. If the X values reported by the UE are all in the form of powers of 2, since the small value is always a divisor of the large value, the SS set configuration may be made based on the minimum value among the reported X values. For the per-X monitoring operation in which different Xs are to be reported, the SS set configuration for the group 1 SS may be configured based on the minimum value among the X values reported by the UE. In addition, the UE may determine the MO assuming that SS configuration (e.g., periodicity, offset, or duration) is made based on the minimum X value.

In addition, the UE may be (implicitly or explicitly) indicated with the X value, which is the reference of the SS set configuration (periodicity, offset, and/or duration) for per-X monitoring operation for multiple cells, from the BS (via RRC or DCI). The UE may recognize that the SS set configuration is made according to the indicated value of X, and may determine the MO accordingly. For example, the UE may determine available X value(s) in a BWP based on all configured SS sets in the BWP. In some implementations, as for the minimum X value, a default value (which is to be used when indication is not received from the BS) may be used.

(Proposal 1a) For the per-X monitoring operation, the configuration (e.g., periodicity, offset, and/or duration) for the group 1 SS may be configured based on the minimum value among X values supportable in the per-X monitoring operation for each SCS, and the UE may determine the PDCCH MO based on the minimum X value.

In order to make the MO of the group 1 SS exist only in the Y slots in the X slots, the SS set configuration (e.g., periodicity, offset, and/or duration) values for the SSs need to include only a multiple of X. X that is supportable for per-X monitoring operation may be predetermined for each SCS. For example, a per-X monitoring operation for 960 kHz may be defined and/or configured based on X=8 and/or X=4, and a per-X monitoring operation for 480 kHz may be defined and/or configured based on X=4 and/or X=2. The UE may report a preferred X for the per-X monitoring operation to the BS for each SCS. In some implementations, the X value may be plural for each SCS.

The SS set configuration may be configured and/or defined based on a minimum value among a plurality of X values. In other words, regardless of the X reported by the UE to the BS, the SS set configuration may be configured and/or defined based on the minimum value among Xs (or (X, Y)) defined for the corresponding SCS in a relevant NR specification.

For example, when X=8 and X=4 (or (X, Y) combination including X=8 or X=4) in per-X monitoring for SCS of 960 kHz is defined in the specification, even when the UE reports that X=8 is supported and does not report that X=4 is supported, the BS may make the SS set configuration based on X=4. When SS set configuration is performed based on X=4, an SS set configuration parameters such as periodicity, offset, and duration may be configured and/or indicated as one of multiples of 4. Alternatively, when the SS set configuration is performed based on X=4, the BS may define a value set of parameters such as (e.g.,) periodicity, offset, and duration with values including multiples of 4, and may configure and/or indicate one value thereamong to the UE.

In another example, when X=8 and X=4 (or (X,Y) combination including X=8 or X=4) for per-X monitoring for SCS of 960 kHz is defined in the specification, in a situation in which X=8 is a mandatory support element that needs to be supported by the UE, and X=4 is an optional support element that is to be supported by only some UEs, even if the UE does not report that X=4 as an optional support element is supported, since X=4 for the corresponding SCS is a value for enabling an operation defined in the specification, the SS set configuration (e.g., periodicity, offset, and/or duration.) may be configured based on X=4.

For example, when (X,Y) is defined for per-X monitoring for 480/960 kHz as follows,

TABLE 7

Supported combinations of (X, Y)
A UE capable of multi-slot monitoring mandatorily supports
For SCS 480 kHz: (X, Y) = (4, 1)
For SCS 960 kHz: (X, Y) = (8, 1)
A UE capable of multi-slot monitoring optionally supports
For SCS 480 kHz: (X, Y) = (4, 2)
For SCS 960 kHz: (X, Y) = (8, 4), (4, 2), (4, 1)

The SS set configuration may be made based on X=4 for SCS of 480 kHz and may be made based on X=4 for SCS of 960 kHz. When (2,1) is added to a (X,Y) combination that is optionally supported for 480 kHz, the SS set configuration for 480 kHz may be made based on X=2.

In addition, for the per-X monitoring operation for multiple cells (instead of performing the SS set configuration based on the minimum value among the reported X values as in the (Proposal 2) method described below), similarly to proposal 1a, the SS set configuration may be made based on the minimum value among X values supported by per-X monitoring for each SCS (regardless of whether the UE reports a specific X value, and/or regardless of the mandatory/optional supported X). When the SS set configuration is performed based on the minimum value among the X values supported by the SS set configuration, parameters of the SS set configuration may be configured as one of multiple values of the minimum value of X. Alternatively, the BS may configure and/or indicate one of the value sets including multiple values of the minimum value of X to the UE.

Although it has been described that the proposed content is applied to the group 1 SS, the corresponding SS set type is not limited to the group 1 SS. For example, the proposal may be applied only to a Type-3 CSS set and/or a UE specific SS.

(Proposal 2) When X is different for each cell for a per-X monitoring operation (for multiple cells), the configuration (periodicity, offset, and/or duration) for the group 1 SS may be configured based on the minimum value among Xs for each cell, and the UE may determine the PDCCH MO based on the minimum X value.

When the UE is configured with per-X monitoring (for multiple cells), X for each cell may be different. For example, for two cells in which SCS of 960 kHz is configured, when cell #0 is configured with X=4, and cell #1 is configured with X=8, the MO for cell #0 may exist every 4 slots (the periodicity is a multiple of 4), the MO for cell #1 may exist every 8 slots (the periodicity is a multiple of 8). Therefore, in order to monitor both cell #0 and cell #1, the UE needs to operate assuming an MO according to X=4, which corresponds to a common divisor (or minimum value) of two X values. That is, for a multi-cell operation having different X values, the SS set configuration for the group 1 SS for the per-X monitoring operation may be configured based on the minimum value among X values for each cell. In addition, the UE may determine the MO assuming that the SS configuration (e.g., periodicity, offset, and/or duration) is made based on the minimum value among the X values.

In addition, the UE may be indicated with an X value, which is a reference of the SS set configuration (some or all of periodicity, offset, and duration) for the per-X monitoring operation for multiple cells from the BS (via RRC or DCI). For example, the X value(s) configured for each cell may be explicitly provided to the UE or implicitly provided to the UE through search space configuration(s) for the corresponding cell (or BWP). The UE may recognize that the SS set configuration is made according to the indicated X value(s) (i.e., configured X value(s)), and may determine the MO accordingly. In this case, the minimum value among the X values may be used as a default value (which is to be used when indication is not received from the BS).

The proposed method is not limited only when per-X monitoring operates for multiple cells. That is, the proposed method may be equally applied to per-X monitoring for a single cell. In addition, the above-described proposed method is not limited to a case where all Xs are different for each cell even when per-X monitoring operates for multiple cells. That is, the methods may be equally applied to the case in which all Xs are the same for each cell, the case in which all Xs are different for each cell, and the case in which the X for some cells is the same and the Xs for some other cells are different. Those skilled in the art may fully understand that some expressions of the above-described proposed method do not necessarily mean a situation limited to the corresponding expressions.

(Proposal 3) When X for each cell is different for the per-X monitoring operation (for multiple cells), the configuration (periodicity, offset, and/or duration) for the group 2 SS may be configured based on X=1 (i.e., slot unit) or may be configured based on a minimum value among X values for each cell, and the UE may determine a PDCCH MO based on X=1 or a minimum value among X values for each cell.

The group 2 SS may correspond to SS set types used when only a cell-specific RRC configuration is configured for an arbitrary UE as a target without a dedicated RRC configuration or SS set types that the commonly configured to a plurality of UE groups. Thus, for an SS set belonging to the group 2 SS, when parameter values of the SS set configuration (e.g., periodicity, offset, and/or duration) for per-X monitoring for multiple cells are configured based on a specific X value, the UE that does not support the corresponding specific X value may not accurately determine an MO location without omission. As a method to solve this problem, for the group 2 SS, an SS set configuration may be made using one of the following three methods. The following methods may be applied to all SS set types belonging to the group 2 SS, or some methods may be applied only to a specific SS set type.

(Method 3-1) The SS set configuration (e.g., periodicity, offset, and/or duration) may be configured based on X=1, and the UE may determine the MO assuming that the SS set configuration is based on X=1. In this case, the meaning of configuring X=1 as a reference may be understood to mean that the SS set configuration is performed in units of slots in the same way as in the existing per-slot monitoring.

(Method 3-2) The SS set configuration (e.g., periodicity, offset, and/or duration) may be configured based on the minimum value of X at which per-X monitoring operation is to be configured for specific SCS. The UE may determine the MO assuming that the SS set configuration of the per-X monitoring operation for the specific SCS is made based on the minimum X value at which the per-X monitoring operation is to be configured for the specific SCS. For example, for per-X monitoring operating at SCS of 960 kHz, if the X value for each cell is only X=8 or X=4, the SS set configuration for the group 2 SS in per-X monitoring for multiple cells may be made based on X=4, and assuming this, the UE may determine the MO location.

(Method 3-3) For SS set types commonly configured to a plurality of UE groups, the SS set configuration (e.g., periodicity, offset, and/or or duration) may be configured based on the minimum value among all X values to be reported by UEs included in the corresponding UE groups. For example, when the minimum value among X values reported by UE #1 for a specific SCS of a specific cell is 4 and the minimum value among X values reported by UE #2 for a specific SCS of a specific cell is 8, the SS set configuration may be made for the specific SCS of the specific cell based on 4. The UE may determine the MO assuming that the SS set configuration of the per-X monitoring operation for a specific SCS is made based on the minimum value among the reportable X values.

The proposed method is not limited only when per-X monitoring operates for multiple cells. That is, the proposed method may be equally applied to per-X monitoring for a single cell. In addition, the above-described proposed method is not limited to a case where all Xs are different for each cell even when per-X monitoring operates for multiple cells. That is, the methods may be equally applied to the case in which all Xs are the same for each cell, the case in which all Xs are different for each cell, and the case in which the X for some cells is the same and the Xs for some other cells are different. Those skilled in the art may fully understand that some expressions of the above-described proposed method do not necessarily mean a situation limited to the corresponding expressions.

(Proposal 4) When a plurality of X values are available for cell(s) or when X values for the respective cells are different in a multi-cell situation, SS set group switching may be performed at a slot-group boundary corresponding to the largest X. Here, cells that may have different Xs may refer to cells belonging to the same cell group for SSSG switching.

Search space set group (SSSG) switching is a feature introduced in rel-16 NR-U, and when a group including a specific (single or multiple) SS set configuration is predefined (different SS set configurations are made for each group), the UE may vary an operation periodicity of PDCCH monitoring according to the ID (or index) of the SSSG. In rel-16, SSSG switching may be applied in Type-3 CSS set and USS.

For example, referring to 3GPP TS 38.213 Rel-16, A UE can be provided a group index for a respective Type3-PDCCH CSS set or USS set by an RRC parameter searchSpaceGroupIdList for PDCCH monitoring on a serving cell. If the UE is not provided the RRC parameter searchSpaceGroupIdList for a search space set, the following procedures are not applicable for PDCCH monitoring according to the search space set. The RRC parameter searchSpaceGroupIdList may be included in an RRC configuration (e.g, IE SearchSpace) which defines how/where to search for PDCCH candidates, and provided to the UE. The RRC parameter searchSpaceGroupIdList is a list of search space group IDs which a corresponding search space defined by IE SearchSpace is associated with. For example, the network may configure 2 search space groups where the group ID is either 0 or 1, or configure 3 search space groups where the group ID is either 0, 1 or 2. One search space set may belong to one SSSG or a plurality of SSSGs. If one search space set belongs to both a SSSG before SSSG switching and a SSSG after SSSG switching, the corresponding search space set is continuously used for PDCCH monitoring even if the SSSG switching occurs. If the UE is not provided with searchSpaceGroupIdList for the search space set, SSSG switching is not applied to PDCCH monitoring according to the search space set. If a UE is provided an RRC parameter cellGroupsForSwitchList, indicating one or more groups of serving cells from a BS, SSSG switching is applied to all serving cells within each group; otherwise, SSSG switching is applied only to a serving cell for which the UE is provided searchSpaceGroupIdList, where the RRC parameter cellGroupsForSwitchList is a list of serving cells which are bundled for the SSSG switching purpose. A serving cell may belong to only one cellGroupForSwitch, and the network configures the same list for all BWPs of serving cells in the same cellGroupForSwitch. When a UE is provided searchSpaceGroupIdList, the UE resets PDCCH monitoring according to search space sets with group index 0, if provided by searchSpaceGroupIdList. In some implementations of the present disclosure, a required time value or the number of symbols from when SSSG switching is notified or triggered until the SSSG switching is provided to the UE by the BS, or the minimum number of symbols $P_{switch}$ may be predefined for each SCS configuration. For example, the UE may receive the number of symbols $P_{switch}$ from the BS by an RRC parameter searchSpaceSwitchDelay. The minimum value of $P_{switch}$ may be provided in the following table, for example, for UE processing capability 1 and UE processing capability 2, and SCS configuration u=0, 1, 2.

TABLE 8

| u | Minimum $P_{switch}$ value for UE processing capability 1 [symbols] | Minimum $P_{switch}$ value for UE processing capability 2 [symbols] |
|---|---|---|
| 0 | 25 | 10 |
| 1 | 25 | 12 |
| 2 | 25 | 22 |

A UE maybe provided from a BS, by an RRC parameter searchSpaceSwitchTimer, a timer value for a serving cell that the UE is provided searchSpaceGroupIdList or, if provided, for a set of serving cells provided by cellGroupsForSwitchList. The BS may configure the same searchSpaceSwitchTimer value for all serving cells belonging to the same cellGroupForSwitch. The UE decrements the timer value by one after each slot based on a reference SCS configuration that is the smallest SCS configuration u among all configured DL BWPs in the serving cell, or in the set of serving cells. If a UE is provided from a BS, by an RRC parameter SearchSpaceSwitchTrigger, a location of a search space set group (SSSG) switching flag field for a serving cell (or for a set of serving cells provided by cellGroupsForSwitchList) in a DCI format 2_0:

if the UE detects a DCI format 2_0 and a value of the search space set group switching flag field in the DCI format 2_0 is 0, the UE starts monitoring PDCCH according to search space sets with group index 0, and stops monitoring PDCCH according to search space sets with group index 1, for the serving cell at a first slot that is at least $P_{switch}$ symbols after the last symbol of the PDCCH with the DCI format 2_0;

if the UE detects a DCI format 2_0 and a value of the search space set group switching flag field in the DCI format 2_0 is 1, the UE starts monitoring PDCCH according to search space sets with group index 1, and stops monitoring PDCCH according to search space sets with group index 0, for the serving cell at a first slot that is $P_{switch}$ symbols after the last symbol of the PDCCH with the DCI format 2_0, and the UE sets the timer value to the value provided by searchSpaceSwitchTimer;

if the UE monitors PDCCH for a serving cell according to search space sets with group index 1, the UE starts monitoring PDCCH for the serving cell according to search space sets with group index 0, and stops monitoring PDCCH according to search space sets with group index 1, for the serving cell at the beginning of the first slot that is at least $P_{switch}$ symbols after a slot where the timer expires or after a last symbol of a remaining channel occupancy duration for the serving cell if indicated by DCI format 2_0.

For each serving cell in a set of serving cells, the UE may receive a location of a SSSG switching flag field in DCI format 2_0 from the BS by an RRC parameter SearchSpaceSwitchTrigger, and the SSSG switching flag may indicate a group from search space sets for PDCCH monitoring for scheduling, for the corresponding serving cell or for the set of the serving cells, provided by the RRC parameter cellGroupsForSwitchList. Each SearchSpaceSwitchTrigger value provides a location of a bit field in a corresponding DCI format, that represents the SSSG switching flag for a serving cell or, if cellGroupsForSwitchList is configured, for a group of serving cells (e.g., a set of serving cells belonging to the same cellGroupForSwitch). In some implementations, for each serving cell in the set of serving cells, the UE may be provided, from a BS, a location of a channel occupancy (CO) duration field in DCI format 2_0, by an RRC parameter CO-DurationsPerCell, that indicates a remaining CO duration for the serving cell starting from a first symbol of a slot where the UE detects the DCI format 2_0 by providing a value from co-DurationList. The CO duration field includes max{ceil($_{log\ 2}$(COdurationListSize)),1} bits, where COdurationListSize is the number of values provided by co-DurationList.

If a UE is not provided SearchSpaceSwitchTrigger for a serving cell:

if the UE detects a DCI format by monitoring PDCCH according to a search space set with group index 0, the UE starts monitoring PDCCH according to search space sets with group index 1, and stops monitoring PDCCH according to search space sets with group index 0, for the serving cell at a first slot that is at least $P_{switch}$ symbols after the last symbol of the PDCCH with the DCI format, the UE sets the timer value to the value provided by searchSpaceSwitchTimer if the UE detects a DCI format by monitoring PDCCH in any search space set;

if the UE monitors PDCCH for a serving cell according to search space sets with group index 1, the UE starts monitoring PDCCH for the serving cell according to search space sets with group index 0, and stops monitoring PDCCH according to search space sets with group index 1, for the serving cell at the beginning of the first slot that is at least $P_{switch}$ symbols after a slot where the timer expires or, if the UE is provided a search space set to monitor PDCCH for detecting a DCI format 2_0, after a last symbol of a remaining channel occupancy duration for the serving cell if indicated by DCI format 2_0.

According to the 3GPP TS 38.213 Rel-16, the UE may determine a slot and a symbol in the slot to start or stop PDCCH monitoring according to search space sets for a serving cell for which the UE receives searchSpaceGroupIdList or, if cellGroupsForSwitchList is provided, for a set of serving cells, based on the smallest SCS configuration u among all configured DL BWPs in the serving cell and, if any, in the serving cell where the UE a PDCCH and detects a corresponding DCI format 2_0 used to notify the start or stop of PDCCH monitoring according to search space sets.

As described above, for per-slot monitoring, switching between different SSSGs may be performed at a slot boundary. For example, after SSSG switching is notified or triggered, PDCCH monitoring may be performed according to the SSSG to be changed from a first slot after more than $P_{switch}$ symbols passes. However, in the case of per-X monitoring, if the SS set configuration is changed in the middle of a slot-group, the complexity of the UE may increase, and accordingly, in order to avoid this, switching between SSSGs needs to be performed at the slot-group boundary.

When the UE is configured to operate multiple cells, X for per-X monitoring may be different for each cell. In this case, an SSSG switching time may be determined in two different ways. Cells having different Xs, referred to in methods to be described later, may mean cells belonging to the same cell group for SSSG switching.

Figure 4:
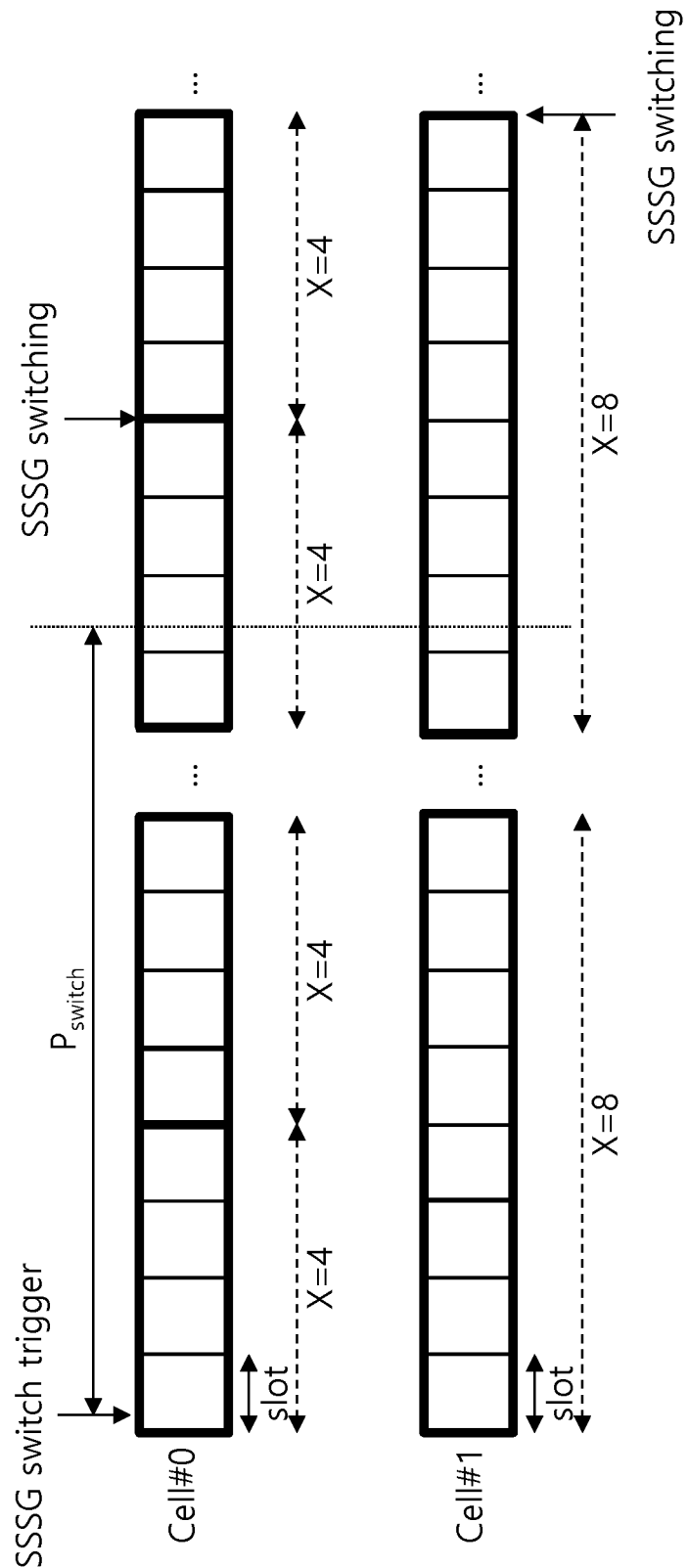
FIGS. 4 and 5 show an example of search space set group switching according to some implementations of the present disclosure.
Figure 5:
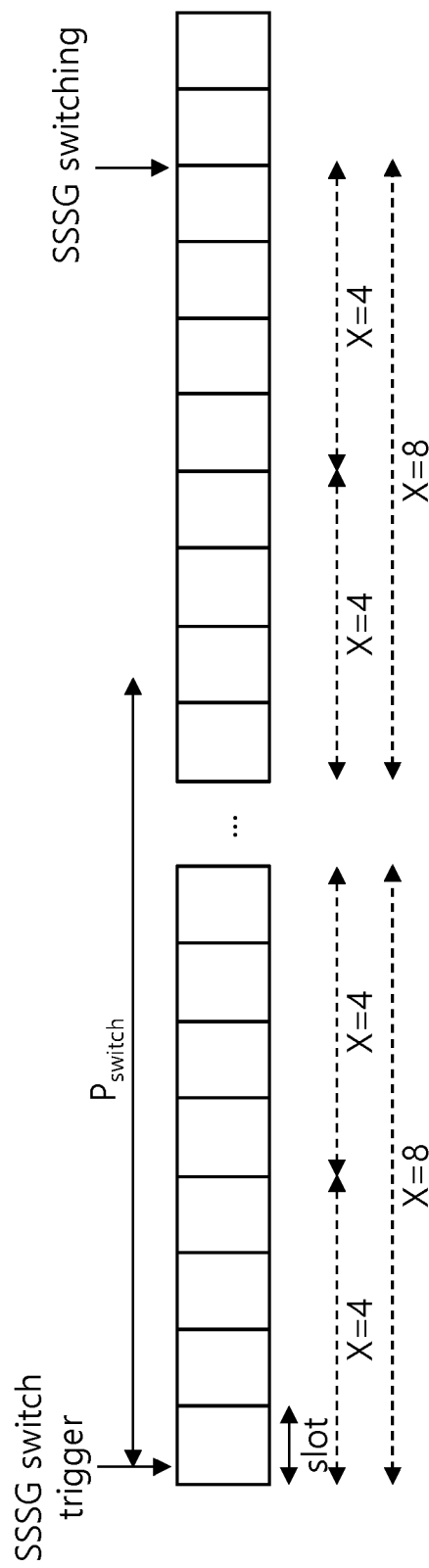

FIGS. 4 and 5 show an example of search space set group switching according to some implementations of the present disclosure.

(Method 4-1) When the value of X is different for each cell, SSSG switching may be performed at a boundary of different Xs (i.e., slot-group) for each cell. As an example thereof, for the case where cell #0 is X=4 and cell #1 is X=8, a situation in which both cell #0 and cell #1 are switched to SSSG #0->SSSG #1 through one SSSG switching triggering may be considered. Both cell #0 and cell #1 may start PDCCH monitoring according to SSSG #1 at a first slot-group boundary after a $P_{switch}$ symbol passes after switching is triggered, but since a slot-group of cell #0 includes 4 slots, and a slot-group of cell #1 includes 8 slots, an actual switching time to SSSG #1 may be different from each other as shown in FIG. 4.

(Method 4-2) Even when the X value is different for each cell, SSSG switching may be performed on all cells monitored by the UE at an X boundary (i.e., a slot-group boundary) based on a reference X. The reference X may be the largest X among Xs values to be supported by the corresponding UE (or among Xs values of cells monitored by the corresponding UE). For example, in the situation of cell #0 and cell #1 exemplified in Method 4-1, when SSSG switching is performed based on X=8 of cell #1, cell #0 may also be changed to SSSG #1 at a slot-group boundary of cell #1 (refer to FIG. 4). As another example, referring to FIG. 5, when multiple X values are available for a single SCS or single cell, SSSG switching may be performed at a slot-group boundary based on the largest X value among the available multiple X values. Through the SSSG method 4-2, SSSG switching may be performed at the same time for all cells monitored by the UE (belonging to CellGroupForSwitch) and for all search space sets for which SSSG switching is configured. In other words, according to some implementations of the present disclosure, even if cell(s) where multi-slot PDCCH monitoring cell(s) (i.e., per-X monitoring) is performed is configured for the UE, SSSG switching may be performed at the same time point for search space sets of the cell(s) or, if a cell group for the SSSG switching is configured, for all cells in the cell group. Through this, the BS and the UE(s) may use an unlicensed spectrum more efficiently, and implementation of the UE may be simplified. Effects obtained by equally matching SSSG switching timings for search space sets or for multiple cells are as follows. During a channel occupancy duration (CO duration) in an unlicensed band (or shared spectrum), SSSG switching may be used before and after the CO duration in order to reduce a frequency of PDCCH monitoring. In a transmission process using multiple cells, such as CA, the CO duration for a plurality of cells may be configured to end at the same time, and in this case, a UE operation may be advantageously simplified by matching the SSSG switching timing between search space sets or between cells.

According to some implementations of the present disclosure, $P_{switch}$ may be a value provided to a UE by a BS or a value predefined according to the SCS configuration u. In some implementations of the present disclosure, for a serving cell for which a SSSG flag field in a DCI format 2_0 is provided by searchSpaceSwitchTrigger, the UE may determine that SSSG switching is triggered i) in the last symbol of a PDCCH with a DCI format 2_0 if the UE detects the DCI format 2_0 in which a value of the SSSG switching flag field is 0 or 1, or ii) in a slot in which a timer expires according to a timer value provided by searchSpaceSwitch-Timer if the UE monitors a PDCCH for the serving cell according to search space sets with a group index 1 or in the last symbol of the remaining CO duration for the serving cell if indicated by DCI format 2_0. In some implementations of the present disclosure, when searchSpaceSwitchTrigger for the serving cell is not provided, the UE may determine that SSSG switching is triggered i) in the last symbol of the PDCCH with a DCI format if the UE monitors a PDCCH and detects the DCI format according to a search space set with group index 0, or ii) in a slot in which a timer expires according to a timer value provided by searchSpaceSwitch-Timer if the UE monitors the PDCCH for the serving cell according to search space sets with group index 1 or in the last symbol of the remaining CO duration for the serving cell if a search space set for monitoring a PDCCH is provided in order for the UE to detect DCI format 2_0 and if indicated by DCI format 2_0. According to some implementations of the present disclosure, the UE may perform SSSG switching for stopping monitoring a PDCCH according to search space set(s) of a SSSG being monitored when the SSSG switching is triggered and starting PDCCH monitoring according to search space set(s) of another SSSG at a beginning of a first slot of a slot-group that is at least $P_{switch}$ symbols after a symbol or slot in which the SSSG switching is triggered.

In addition, it may be possible to flexibly change Method 4-1 and Method 4-2. That is, the BS may indicate whether an SSSG switching time of each cell is a boundary of different Xs for each cell or a boundary of a reference X (e.g., largest X) to the UE through higher layer signaling such as RRC. Alternatively, a 1-bit field may be added to DCI format 2_0 that can be used for notifying SSSG switching, and information indicating one of Method 4-1 and Method 4-2 may be transmitted through the added 1-bit field. As such, when an individual CO section is obtained for each beam, there is an advantage that an SSSG switching time is to be individually configured for each beam. As another method, one of the methods 4-1 and 4-2 may be pre-defined according to the SSSG switching trigger type. For example, when switching is notified or triggered through DCI 2_0, etc., the switching time points of all cells are aligned with the largest X boundary, and when switching is triggered through SSSG switching timer expire, SSSG switching may be performed at a boundary between different Xs for each cell. Alternatively, in an unlicensed band (or shared spectrum) operation, SSSG switching may be performed for each cell at an X boundary of each cell when entering the CO section, and switching times may be matched with each other according to the largest X in all cells when switching is triggered due to end of the CO section. As such, unnecessary power consumption may be reduced during the CO section, and when the CO section ends, all cells may perform SSSG switching at the same time, thereby reducing the complexity of the UE operation.

(Proposal 5) SSSG switching boundary alignment method of cells belonging to CellGroupForSwitch (5-1) One of the following methods may be applied to align SSSG switching boundaries of cells belonging to/included in CellGroupForSwitch. Hereinafter, Xs may have the same meaning as X of the above proposals.

Align based on the largest Xs among all configured BWPs for all cells in the same CellGroupForSwitch Align based on the largest Xs among all active BWPs for all cells in the same CellGroupForSwitch Align based on the largest Xs among all reported Xs values by a UE (5-2) Even when only one serving cell is included in CellGroupForSwitch or CellGroupForSwitch is not configured (that is, in the case of a single serving cell), if Xs values configured for respective corresponding DL (or UL) BWPs are different, SSSG switching boundaries may be aligned based on the largest Xs value (refer to FIG. 5). For example, this may be represented as follows.

Align based on all configured/active BWPs or the largest Xs among all reported Xs values (5-3) In some implementations, cells grouped to CellGroupForSwitch may be restricted to have the same Xs per SCS (or to configure only cells with the same Xs value by CellGroupForSwitch). For example, a UE (configured with 480/960 kHz) may not expect cells (or BWPs of corresponding cells) of a plurality of configured cells having the same SCS but different configured Xs to be grouped by the same CellGroupForSwitch.

In proposal 5, the configured Xs may be Xs that is explicitly or implicitly provided to a UE by a BS. For example, the BS may implicitly provide the UE with explicit Xs value(s) for the corresponding cell (or BWP or SCS), or may implicitly provide the UE with Xs value(s) configured for the corresponding cell (or BWP or SCS) through search space configuration(s). The UE may determine Xs value(s) configured for the corresponding cell (or BWP or SCS) based on implicitly provided Xs value(s) or Xs value(s) related to search space set(s) configured for the corresponding cell (or BWP or SCS).

Additionally, as described above, a delay of SSSG switching (or switching time point) of cells belonging to CellGroupForSwitch may be determined based on the SCS(s) of all configured BWPs configured in the corresponding UE or SCS(s) of all active BWPs among BWPs configured in the corresponding UE. That is, when SCSs configured in cells (or BWPs) included in CellGroupForSwitch are different, SSSG switching may be simultaneously performed on cells belonging to CellGroupForSwitch at a slot boundary of an SCS corresponding to the smallest value (i.e., the smallest value among SCS(s) of cells belonging to CellGroupForSwitch) among SCS(s) of each cell. In this case, SCS(s) configured in all configured BWP(s) may be used as SCS(s) of each cell or SCS(s) configured in all active BWP(s) may be used. To this end, an RRC configuration for configuring/indicating/selecting one of two references may be introduced.

Additionally, the UE may operate as follows for a per-X monitoring operation. Alternatively, the UE may be configured to operate as follows (by the BS via RRC, etc.).

With regard to a UE configured with per-X monitoring, the UE may perform monitoring in all slot-groups with a size X for some CSSs (e.g., CSS such as type 0/0A) and may be configured to perform monitoring only in a specific/partial Y slot in X slots for some other CSSs (e.g., type 3 CSS) and/or UE-specific SS (i.e., USS). In this case, for the specific CSS type to be monitored in an arbitrary slot of a slot-group with a size X, the UE may be predefined to performed monitoring only in a corresponding Y slot or may be configured via RRC or the like (to the UE by the BS) for a UE-specific RNTI (e.g., C-RNTI and/or MCS-C-RNTI and/or CS-RNTI). Alternatively, the UE may report to the BS that a corresponding operation is a possible/preferred UE through a UE capability report.

In some implementations, the aforementioned "configured X", "configured X", "configured Xs", "indicated Xs", "configured slot-group size" or "indicated slot-group size" may be determined based on search space configuration(s) received from the BS by the UE.

The content of the present disclosure is not limited only to transmission and reception of uplink and/or downlink signals. For example, the content of the present disclosure may be used in direct communication between UEs. In addition, a BS in the present disclosure may be a concept including a relay node as well as a BS. For example, an operation of the BS in the present disclosure may be performed by the BS, but may also be performed by the relay node.

Since examples of the above-described proposed method may also be included as one of the implementation methods of the present disclosure, it is obvious that the examples may be regarded as a kind of proposed method. In addition, the above-described proposed methods may be implemented independently, but may also be implemented in the form of a combination (or merge) of some of the proposed methods. Rules may be defined in such a way that information on whether the proposed methods are applied (or information on the rules of the proposed methods) is informed by the BS to the UE or by a transmitting UE to a receiving UE through a predefined signal (e.g., a physical layer signal or a higher layer signal).

Embodiment

Figure 6:
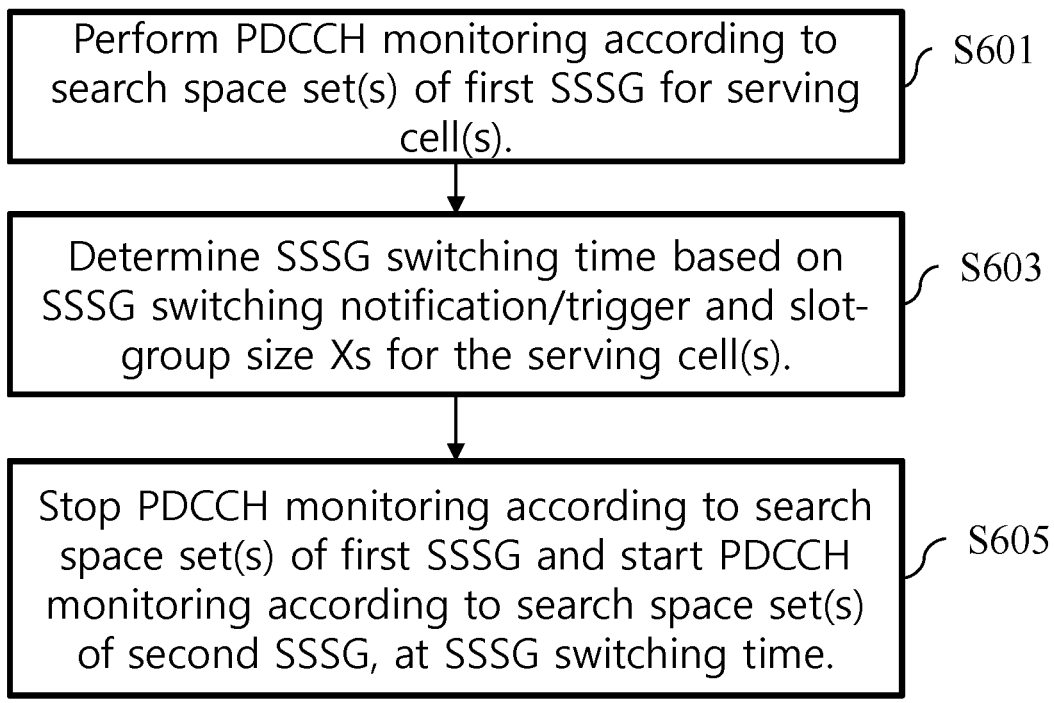
FIGS. 6 and 7 show an example of signal transmission/reception flows according to an embodiment of the present disclosure.
Figure 7:
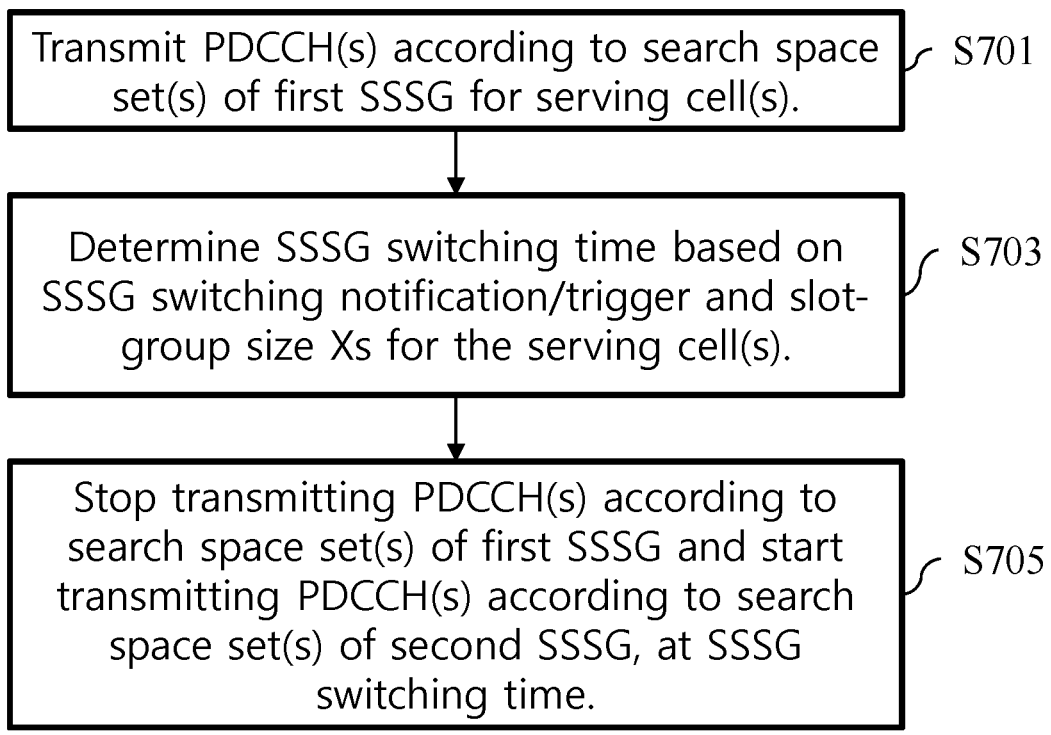

FIG. 6 and FIG. 7 are flowcharts of methods of transmitting and receiving a signal according to an embodiment of the present disclosure.

Referring to FIG. 6, some implementations of the disclosure may be performed by a UE, or by executing instructions stored in the UE or in a memory in a device for the UE, or by executing instructions or program stored in a non-transitory storage medium. Operations by the UE or the indications/program may include: performing PDCCH monitoring according to search space set(s) with a first group index for a serving cell or a serving cell set (e.g., serving cells belonging to the same cellGroupForSwitch) (S601). While performing PDCCH monitoring according to search space set(s) of the first SSSG, the UE may recognize that SSSG switching is notified or triggered according to some implementations of the disclosure. For example, the UE or the operations may determine that SSSG switching is triggered based on detection of a DCI format for notifying SSSG switching for the serving cell or the serving cell set, expiration of a SSSG switching-related timer, or end of the remaining CO duration. The UE may determine a SSSG switching time for the notified/triggered SSSG switching (S603). In some implementations, the UE or the operations may determine the SSSG switching time based on a slot-group size (hereinafter, Xs) for the serving cell or the serving cell set. The UE or the operations may stop PDCCH monitoring according to search space set(s) of the first SSSG at the SSSG switching time and may start PDCCH monitoring according to search space set(s) of a second SSSG with a second group index different from the first group index (S605).

In some implementations, in addition to the operations described with reference to FIG. 6, one or more of the operations described with reference to FIGS. 1 to 5 and/or the operations described in Section 1 may be further performed in combination.

Referring to FIG. 7, some implementations of the disclosure may be performed by a BS, or by executing instructions stored in a BS or in a memory in a device for the BS or executing instructions or program stored in a non-transitory storage medium. Operations by the BS or the indications/program may include: performing PDCCH transmission according to search space set(s) of a first SSSG with a first group index for a serving cell or a serving cell set (e.g., serving cells belonging to the same cellGroupForSwitch) (S701). While performing PDCCH transmission according to the search space set(s) of the first SSSG, the BS or the operations may recognize that SSSG switching is notified or triggered according to some implementations of the disclosure. For example, the BS or the operations may determine that the SSSG switching is triggered based on transmission of a DCI format for triggering SSSG switching for the serving cell or the serving cell set, expiration of a SSSG switching-related timer, or end of the remaining CO duration. The BS or the operations may determine a SSSG switching time for the triggered SSSG switching (S703). In some implementations, the BS or the operations may determine the SSSG switching time based on a slot-group size (hereinafter, Xs) for the serving cell or the serving cell set. The BS or the operations may stop transmitting PDCCH(s) according to the search space set(s) of the first SSSG at the SSSG switching time and may start transmitting PDCCH(s) according to search space set(s) of a second SSSG with a second group index different from the first group index (S705).

In some implementations, search space configurations including the first group index of the first SSSG and the second group index of the second SSSG may be provided to the UE by the BS.

In some implementations, the UE, the BS, or the operations may determine the SSSG switching based on the largest Xs among Xs values for the serving cell or the serving cell set when per-X PDCCH monitoring is performed for the serving cell or the serving cell set.

In some implementations, an SCS of the serving cell or the serving cell set for which per-X PDCCH monitoring is performed may be 960 kHz. In some implementations, an SCS of the serving cell or the serving cell set for which per-X PDCCH monitoring is performed may be 480 kHz. In some implementations, SCS(s) of the serving cell set for which per-X PDCCH monitoring is performed may be 480 kHz and/or 960 kHz.

In some implementations, the UE or the operations may include: receiving search space configurations for at least one serving cell (e.g., a serving cell or a serving cell set), the search space configurations including at least a configuration regarding at least one search space set belonging to a first search space set group (SSSG) with a first group index and a configuration regarding at least one search space set belonging to a second SSSG with a second group index; performing physical downlink control channel (PDCCH) monitoring according to the search space set of the first SSSG for the at least one serving cell based on the search space configurations; and performing SSSG switching based on detection of a DCI format for notifying SSSG switching for the at least one serving cell or based on expiration of a SSSG switching-related timer. In some implementations, based on the at least one serving cell including a serving cell having a subcarrier spacing of 960 kHz, the SSSG switching may include: i) stopping the PDCCH monitoring according to the search space set of the first SSSG and ii) starting the PDCCH monitoring according to the search space set of the second SSSG, at a beginning of a first slot of slot-groups of Xs slots that is at least predetermined number $P_{switch}$ symbols after the last symbol of the PDCCH with the DCI format, where the slot-groups of Xs slots are consecutive. In some implementations, based on the at least one serving cell including a serving cell having a subcarrier spacing of 960 kHz, the UE or the operations may determine a slot and a symbol in the slot to stop or start the PDCCH monitoring for the SSSG switching based on the largest Xs value among Xs value(s) (e.g., Xs value(s) related/configured with the at least one serving cell) for the at least one serving cell.

In some implementations, the BS or the operations may include: transmitting search space configurations for at least one serving cell (e.g., a serving cell or a serving cell set), the search space configurations including at least a configuration regarding at least one search space set belonging to a first search space set group (SSSG) with a first group index and a configuration regarding at least one search space set belonging to a second SSSG with a second group index; transmitting at least one physical downlink control channel (PDCCH) according to the search space set of the first SSSG for the at least one serving cell based on the search space configurations; and performing the SSSG switching based on transmission of a DCI format for notifying SSSG switching for the at least one serving cell or based on expiration of a SSSG switching-related timer. In some implementations, based on the at least one serving cell including a serving cell having a subcarrier spacing of 960 kHz, the SSSG switching may include: i) stopping transmitting at least one PDCCH according to the search space set of the first SSSG and ii) starting transmitting at least one PDCCH according to the search space set of the second SSSG, at a beginning of a first slot among slot-groups of Xs slots that is at least predetermined number $P_{switch}$ symbols after the last symbol of the PDCCH with the DCI format, where the slot-groups of Xs slots are consecutive. In some implementations, based on the at least one serving cell including a serving cell having a subcarrier spacing of 960 kHz, the BS or the operations may determine a slot and a symbol in the slot, in which the SSSG switching is performed, based on the largest Xs value among Xs value(s) (e.g., Xs value(s) related/configured with the at least one serving cell) for the at least one serving cell.

In some implementations, cell group configuration for switching may be provided to the UE by the BS. When the switching cell group configuration is provided, the at least one serving cell may be a serving cell set. Based on the cell group configuration for switching, the SSSG switching may be performed on all serving cells in the serving cell set.

In some implementations, the cell group configuration for switching may be a radio resource control (RRC) parameter cellGroupForSwitch.

In some implementations, information regarding the predetermined number $P_{switch}$ may be provided to the UE by the BS.

In some implementations, the predetermined number $P_{switch}$ may be predefined for the subcarrier spacing of 960 kHz and processing capability of the UE.

In some implementations, each search space set in the first SSSG and the second SSSG may be configured based on one Xs value among Xs values for the at least one serving cell.

In some implementations, each of the Xs values for the at least one serving cell may be related to a search space set configured for the at least one serving cell.

In some implementations, information regarding a location of a SSSG flag field in the DCI format for the at least one serving cell may be provided to the UE by the BS.

In some implementations, the DCI format may be DCI format 2_0.

Example of Communication System to which the Present Disclosure is Applied

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 8:
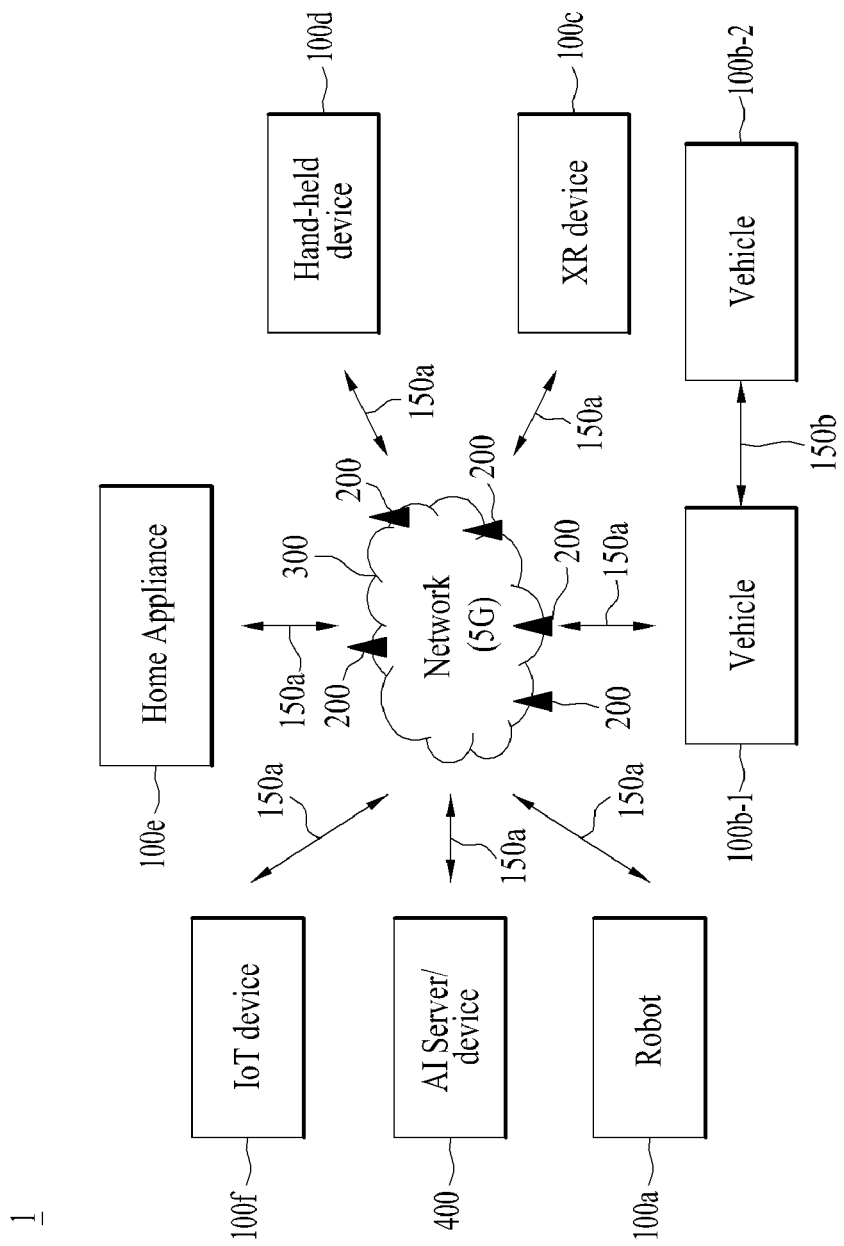
FIG. 8 illustrates a communication system 1 applied to the present disclosure.

FIG. 8 illustrates a communication system 1 applied to the present disclosure.

Referring to FIG. 8, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g., V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g., relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Example of Wireless Device to which the Present Disclosure is Applied

Figure 9:
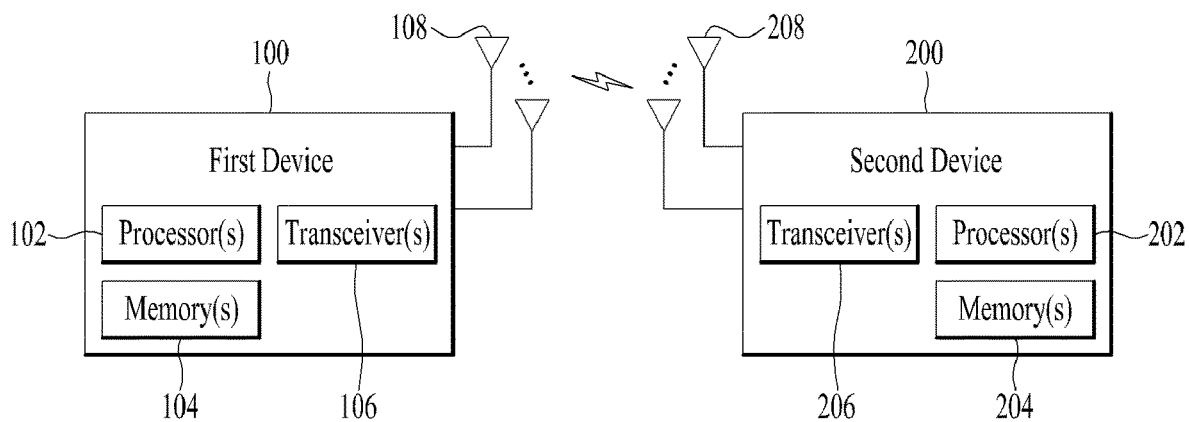
FIG. 9 illustrates wireless devices applicable to the present disclosure.

FIG. 9 illustrates wireless devices applicable to the present disclosure.

Referring to FIG. 9, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 8.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Example of Use of Wireless Device to which the Present Disclosure is Applied

Figure 10:
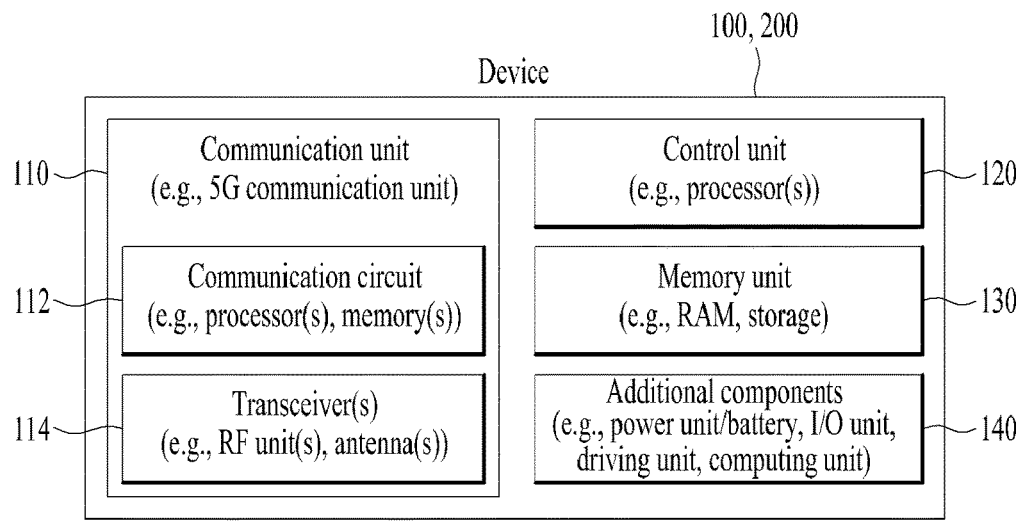
FIG. 10 illustrates another example of a wireless device applied to the present disclosure.

FIG. 10 illustrates another example of a wireless device applied to the present disclosure. The wireless device may be implemented in various forms according to a use case/service (refer to FIG. 8).

Referring to FIG. 10, wireless devices 100 and 200 may correspond to the wireless devices 100 and 200 of FIG. 9 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 9. For example, the transceiver(s) 114 may include the one or more transceivers 106 and 206 and/or the one or more antennas 108 and 208 of FIG. 9. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 8), the vehicles (100b-1 and 100b-2 of FIG. 8), the XR device (100c of FIG. 8), the hand-held device (100d of FIG. 8), the home appliance (100e of FIG. 8), the IoT device (100f of FIG. 8), a digital broadcasting terminal, a hologram device, a public safety device, an MTC device, a medical device, a FinTech device (or a finance device), a security device, a climate/environment device, the AI server/device (400 of FIG. 8), the BSs (200 of FIG. 8), a network node, or the like. The wireless device may be mobile or fixed according to a use case/service.

In FIG. 10, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 11:
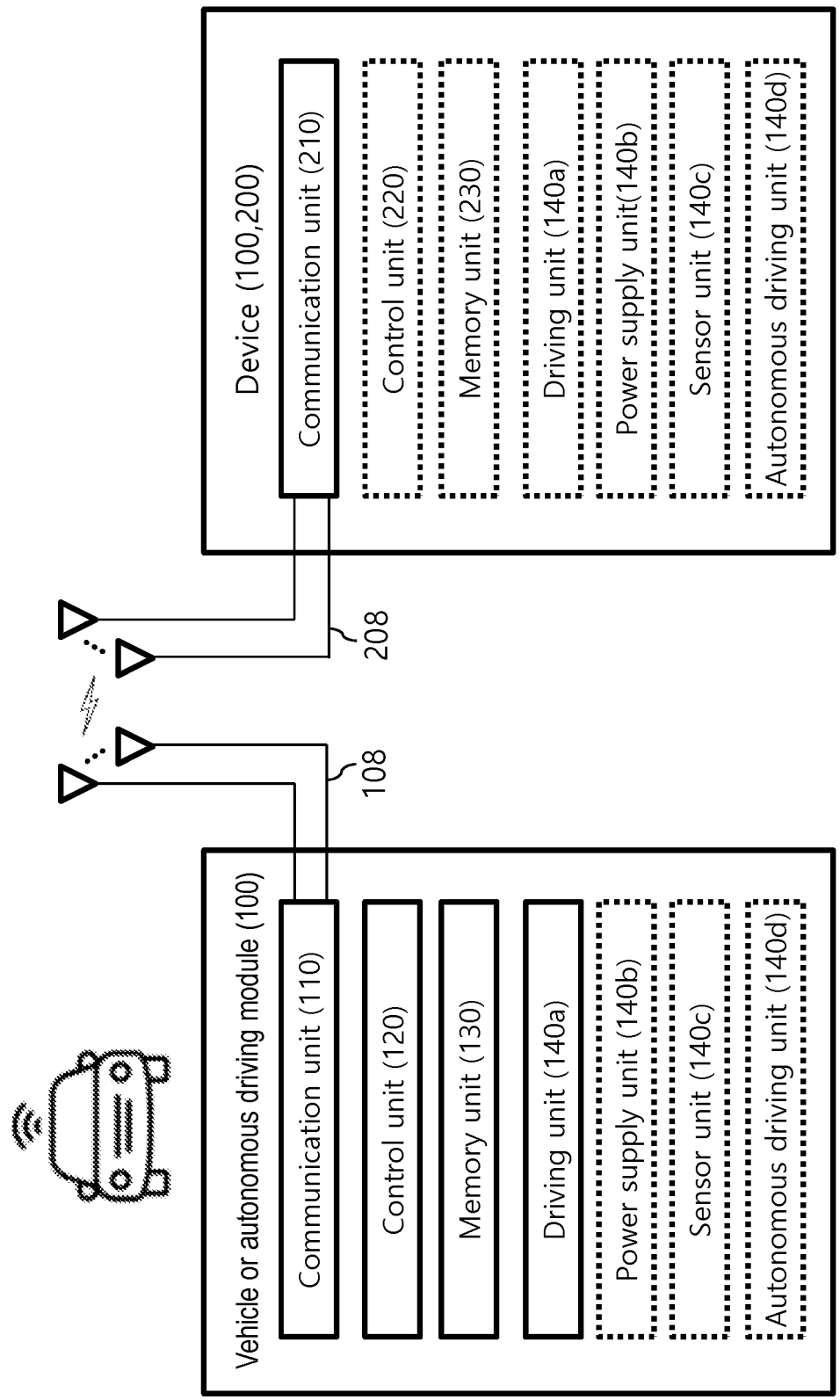
FIG. 11 illustrates a vehicle or an autonomous driving vehicle applied to the present disclosure.

Example of Vehicle or Autonomous Driving Vehicle to which the Present Disclosure is Applied FIG. 11 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 11, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 10, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

As described above, the present disclosure is applicable to various wireless communication systems.

What is claimed is:

1. A method of monitoring a control channel by a user equipment (UE) in a wireless communication system, the method comprising:
    performing physical downlink control channel (PDCCH) monitoring according to search space sets with a first group index for a serving cell; and
    based on detection of a downlink control information (DCI) format used for notifying search space set group SSSG switching and based on a subcarrier spacing in the serving cell being equal to 960 kHz:
        at a beginning of a first slot, of a slot-group of $X_s$ slots, that is at least predetermined number $P_{switch}$ symbols after a last symbol of a PDCCH with the DCI format, performing the SSSG switching that includes i) starting PDCCH monitoring according to search space sets with a second group index and ii) stopping PDCCH monitoring according to the search space sets with the first group index, for the serving cell, where slot-groups of $X_s$ slots are consecutive, and
    wherein, based on a set of serving cells including the serving cell with the subcarrier spacing of 960 kHz, the UE determines a slot and a symbol in the slot to start or stop PDCCH monitoring according to search space sets for the set of serving cells based on a largest $X_s$ value for the set of serving cells.

2. The method of claim 1, further comprising:
    receiving a cell group configuration for switching for the set of serving cells, wherein the SSSG switching is performed for all serving cells in the set of serving cells based on the cell group configuration for switching.

3. The method of claim 2, wherein the cell group configuration for switching includes a radio resource control (RRC) parameter cellGroupForSwitch.

4. The method of claim 1, further comprising:
receiving information regarding the predetermined number $P_{switch}$.

5. The method of claim 1, wherein the predetermined number $P_{switch}$ is predefined for the subcarrier spacing of 960 kHz and processing capability of the UE.

6. The method of claim 1, wherein each search space set in the search space sets with the first group index and the search space sets with the second group index is configured based on one $X_s$ value among $X_s$ values for the set of serving cells.

7. The method of claim 1, wherein each $X_s$ value for the set of serving cells is related to a search space set configured for the set of serving cells.

8. The method of claim 1, further comprising:
receiving information regarding a location of a SSSG flag field in the DCI format for the set of serving cells,
wherein the DCI format is DCI format 2_0.

9. A user equipment (UE) for monitoring a control channel in a wireless communication system, comprising:
at least one transceiver;
at least one processor; and
at least one computer memory operatively connected to the at least one processor and configured to store instructions that when executed causes the at least one processor to perform operations including:
performing physical downlink control channel (PDCCH) monitoring according to search space sets with a first group index for a serving cell; and
based on detection of a downlink control information (DCI) format used for notifying search space set group SSSG switching and based on a subcarrier spacing in the serving cell being equal to 960 kHz:
at a beginning of a first slot, of a slot-group of $X_s$ slots, that is at least predetermined number $P_{switch}$ symbols after a last symbol of a PDCCH with the DCI format, performing the SSSG switching that includes i) starting PDCCH monitoring according to search space sets with a second group index and ii) stopping PDCCH monitoring according to the search space sets with the first group index, for the serving cell, where slot-groups of $X_s$ slots are consecutive, and
wherein, based on a set of serving cells including the serving cell with the subcarrier spacing of 960 kHz, the UE determines a slot and a symbol in the slot to start or stop PDCCH monitoring according to search space sets for the set of serving cells based on a largest $X_s$ value for the set of serving cells.

10. A base station (BS) for transmitting a control channel in a wireless communication system, comprising:
at least one transceiver;
at least one processor; and
at least one computer memory operatively connected to the at least one processor and configured to store instructions that when executed causes the at least one processor to perform operations including:
transmitting at least one physical downlink control channel (PDCCH) according to the search space set with a first group index for a serving cell; and
based on transmission of a downlink control information (DCI) format used for notifying search space set group (SSSG) switching and based on a subcarrier spacing in the serving cell being equal to 960 kHz:
at a beginning of a first slot, of a slot-group of $X_s$ slots, that is at least predetermined number $P_{switch}$ symbols after a last symbol of a PDCCH with the DCI format, performing the SSSG switching that includes i) starting transmitting at least one PDCCH according to search space sets with a second group index and ii) stopping transmitting at least one PDCCH according to the search space sets with the first group index, for the serving cell, where slot-groups of $X_s$ slots are consecutive, and
wherein, based on a set of serving cells including the serving cell with the subcarrier spacing of 960 kHz, the BS determines a slot and a symbol in the slot to perform the SSSG switching based on a largest $X_s$ value for the set of serving cells.

11. The BS of claim 10, wherein the operations further comprise:
transmitting a cell group configuration for switching for the set of serving cells,
wherein the SSSG switching is performed for all serving cells in the set of serving cells based on the cell group configuration for switching.

12. The BS of claim 11, wherein the cell group configuration for switching includes a radio resource control (RRC) parameter cellGroupForSwitch.

13. The BS of claim 10, wherein the operations further comprise:
transmitting information regarding the predetermined number $P_{switch}$.

14. The BS of claim 10, wherein the predetermined number $P_{switch}$ is predefined for the subcarrier spacing of 960 kHz and processing capability of a user equipment (UE).

15. The BS of claim 10, wherein each search space set in the search space sets with the first group index and the search space sets with the second group index is configured based on one $X_s$ value among $X_s$ values for the set of serving cells.

16. The BS of claim 10, wherein each $X_s$ value for the set of serving cells is related to a search space set configured for the set of serving cells.

17. The BS of claim 10, wherein the operations further comprise:
transmitting information regarding a location of a SSSG flag field in the DCI format for the set of serving cells,
wherein the DCI format is DCI format 2_0.

* * * * *